United States Patent
Sekiya et al.

(10) Patent No.: US 11,548,815 B2
(45) Date of Patent: Jan. 10, 2023

(54) CHEMICALLY STRENGTHENED GLASS, AND METHOD FOR MANUFACTURING THE SAME

(71) Applicant: AGC Inc., Tokyo (JP)

(72) Inventors: Kaname Sekiya, Tokyo (JP); Yusuke Fujiwara, Tokyo (JP)

(73) Assignee: AGC Inc., Tokyo (JP)

( * ) Notice: Subject to any disclaimer, the term of this patent is extended or adjusted under 35 U.S.C. 154(b) by 0 days.

(21) Appl. No.: 17/388,494

(22) Filed: Jul. 29, 2021

(65) Prior Publication Data

US 2022/0033299 A1    Feb. 3, 2022

(30) Foreign Application Priority Data

Jul. 31, 2020 (JP) ............................. JP2020-131057
Feb. 26, 2021 (JP) ............................. JP2021-030729

(51) Int. Cl.
| | |
|---|---|
| *B32B 15/04* | (2006.01) |
| *B32B 17/06* | (2006.01) |
| *C03C 21/00* | (2006.01) |
| *C03C 3/083* | (2006.01) |
| *C03C 4/18* | (2006.01) |

(52) U.S. Cl.
CPC ............ *C03C 21/002* (2013.01); *C03C 3/083* (2013.01); *C03C 4/18* (2013.01); *C03C 2204/00* (2013.01)

(58) Field of Classification Search
CPC .................................................... C03C 21/002
USPC .................................................. 428/426, 410
See application file for complete search history.

(56) References Cited

U.S. PATENT DOCUMENTS

| | | |
|---|---|---|
| 2015/0030834 A1 | 1/2015 | Morey et al. |
| 2015/0239775 A1 | 8/2015 | Amin et al. |
| 2015/0239776 A1 | 8/2015 | Amin et al. |
| 2015/0259244 A1 | 9/2015 | Amin et al. |
| 2015/0368148 A1 | 12/2015 | Duffy et al. |
| 2015/0368153 A1 | 12/2015 | Pesansky et al. |
| 2016/0257605 A1 | 9/2016 | Amin et al. |
| 2016/0264452 A1 | 9/2016 | Amin et al. |
| 2017/0036952 A1 | 2/2017 | Amin et al. |
| 2017/0036953 A1 | 2/2017 | Amin et al. |
| 2017/0129803 A1 | 5/2017 | Amin et al. |
| 2019/0047909 A1 | 2/2019 | Amin et al. |

FOREIGN PATENT DOCUMENTS

| | | |
|---|---|---|
| JP | 2017-523110 A | 6/2017 |
| WO | WO 2020/075708 | 4/2020 |

*Primary Examiner* — Lauren R Colgan
(74) *Attorney, Agent, or Firm* — Oblon, McClelland, Maier & Neustadt, L.L.P.

(57) ABSTRACT

The present invention relates to a chemically strengthened glass having a thickness of t [mm], and having a profile of a stress value $CS_x$ [MPa] at a depth x [μm] from a surface of the glass, the stress value being measured by a scattered-light photoelastic stress meter, in which a second-order differential value $CS_x''$ of the stress value $CS_x$ in the profile satisfies the following expression within a range of $CS_x \geq 0$: $0 < CS_x'' \leq 0.050$.

20 Claims, 18 Drawing Sheets

CHEMICALLY STRENGTHENED GLASS, AND METHOD FOR MANUFACTURING THE SAME

TECHNICAL FIELD

The present invention relates to a chemically strengthened glass, and a method for manufacturing the same.

BACKGROUND ART

A chemically strengthened glass is used as a cover glass or the like in a portable terminal. The chemically strengthened glass is a glass which has been brought into contact with a molten salt composition such as sodium nitrate to thereby achieve ion exchange between alkali metal ions contained in the glass and alkali metal ions contained in the molten salt composition and having larger ionic radii so as to form a compressive stress layer in a surface part of the glass. The strength of the chemically strengthened glass depends on a stress profile expressed by a compressive stress value (hereinafter also referred to as CS) with a depth from the glass surface as a variable.

A cover glass of a portable terminal or the like may be cracked due to deformation at the time of falling or the like. In order to prevent such destruction, that is, destruction caused by bending, it is effective to increase a compressive stress in the glass surface. To this end, a high surface compressive stress of 700 MPa or more is often formed recently.

On the other hand, a cover glass of a portable terminal or the like may be cracked due to collision with a protrusion when the terminal falls down onto asphalt or sands. In order to prevent such destruction, that is, destruction caused by an impact, it is effective to increase a depth of a compressive stress layer to thereby form the compressive stress layer reaching to a deeper part of the glass so as to improve the strength.

However, when a compressive stress layer is formed in a surface part of a glass article, tensile stress (hereinafter referred to as CT) corresponding to the total amount of compressive stress in the surface inevitably appears in a central part of the glass article. When the glass article having a too high tensile stress value is broken, the glass article is cracked violently and scattered its pieces. When CT exceeds its threshold (hereinafter also referred to as CT limit), the number of crushed pieces in the damaged glass article increases explosively.

Therefore, in the chemically strengthened glass, the compressive stress in the surface is increased to form a compressive stress layer reaching to a deeper part while the total amount of compressive stress in the surface layer is designed to prevent CT from exceeding the CT limit. For example, Patent Document 1 discloses a chemically strengthened glass having CT controlled within a specific range.

Patent Document 1: JP-T-2017-523110

SUMMARY OF INVENTION

In this manner, a chemically strengthened glass excellent in falling strength which has a compressive stress layer formed therein while avoiding a CT limit so that destruction caused by impact can be suppressed is required.

An object of the present invention is therefore to provide a chemically strengthened glass capable of inhibiting destruction caused by impact and excellent in falling strength, and a method for manufacturing the same.

The present inventors made investigations about the aforementioned problem. As a result, the present inventors found that when lithium ions within a specific concentration range are added to a molten salt composition to be used in second stage chemical strengthening of two stages for chemically strengthening a lithium-containing glass, it is possible to obtain a chemically strengthened glass in which a compressive stress in a deep layer of the glass, which is effective in resistance against impact at the time of falling, has been controlled to be at a certain level or higher while a compressive stress in a surface of the glass has been reduced. Thus, the present inventors found that the aforementioned problem can be solved by the chemically strengthened glass, and completed the present invention.

The present invention relates to a chemically strengthened glass having a thickness of t [mm], and having a profile of a stress value $CS_x$ [MPa] at a depth x [μm] from a surface of the glass, the stress value being measured by a scattered-light photoelastic stress meter, in which a second-order differential value $CS_x''$ of the stress value $CS_x$ in the profile satisfies the following expression within a range of $CS_x \geq 0$:

$$0 < CS_x'' \leq 0.050.$$

The present invention relates to a method of manufacturing a chemically strengthened glass, the method including:

immersing a lithium-containing glass into a first molten salt composition including sodium ions and potassium ions to thereby perform first ion exchange; and immersing the lithium-containing glass into a second molten salt composition including potassium ions to thereby perform second ion exchange, in which in the first molten salt composition, a concentration of potassium nitrate is higher than a concentration of sodium nitrate, and in the second molten salt composition, a concentration of potassium nitrate is 85 mass % or higher, and a mass ratio of sodium ions to lithium ions is 0 or higher and 15 or lower.

The chemically strengthened glass according to the present invention has a specific stress profile so that the chemically strengthened glass can avoid a CT limit and show an excellent falling strength.

BRIEF DESCRIPTION OF DRAWINGS

FIG. 8A shows the stress profiles up to a depth of 100 μm; and FIG. 8B shows the stress profiles enlarged between a surface layer and a depth of 3 μm.

DESCRIPTION OF EMBODIMENTS

<Method for Measuring Stress>

Figure 1A:
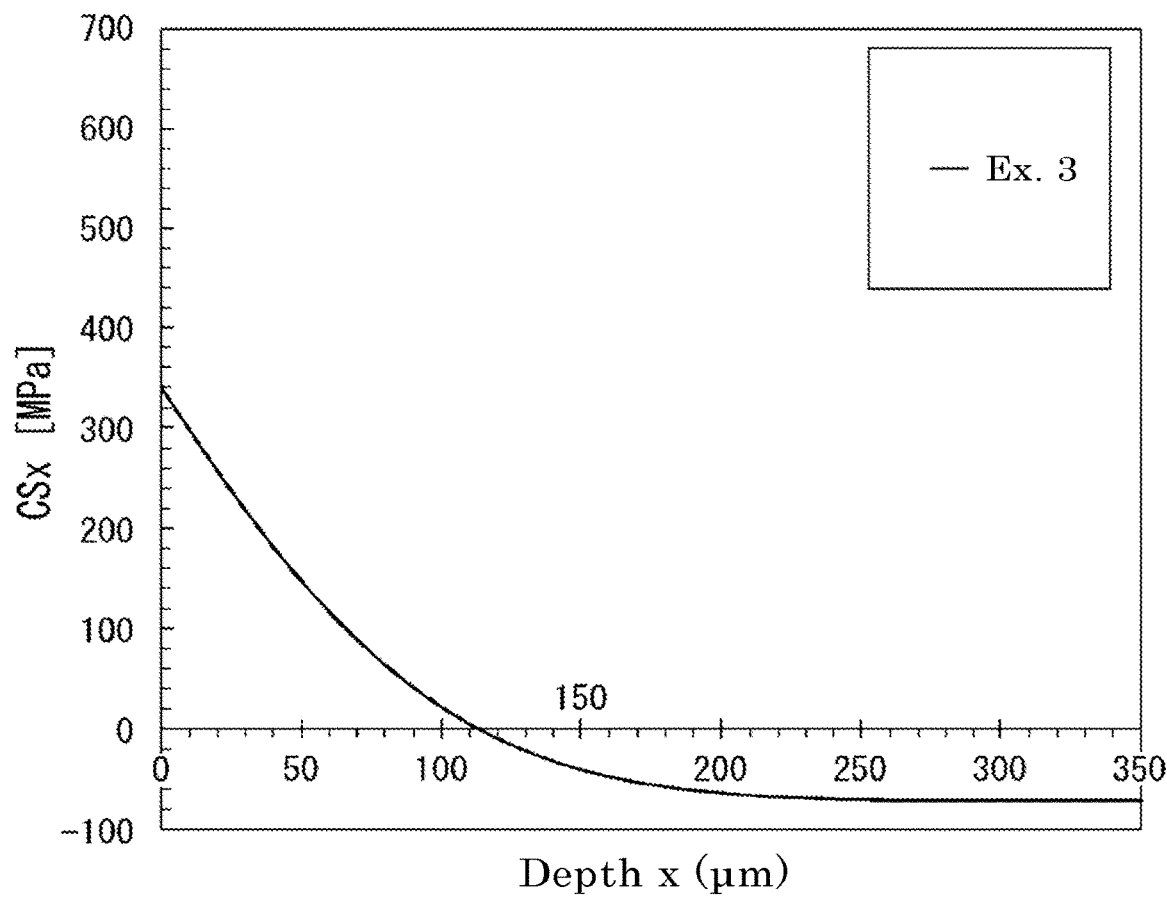
FIG. 1A shows an example of a profile of a stress value $CS_x$ in the present invention.

Recently, glasses chemically strengthened at two stages have been mainstream for cover glasses of smartphones and the like. In the two-stage chemical strengthening, lithium ions inside a glass are exchanged with sodium ions (Li—Na exchange), and then, in a surface layer part of the glass, the sodium ions inside the glass are exchanged with potassium ions (Na—K exchange).

A stress profile of such a two-stage chemically strengthened glass can be non-destructively acquired, for example, by use of combination of a scattered light photoelastic stress meter (hereinafter also referred to as SLP), a film stress measurement (hereinafter referred to as FSM), and the like.

In a method using the scattered light photoelastic stress meter (SLP), a compressive stress derived from Li—Na exchange can be measured inside a glass at several tens of μm or more deep from a surface layer of the glass. On the other hand, in a method using the film stress measurement (FSM), a compressive stress derived from Na—K exchange can be measured in a surface layer part of a glass at several tens of μm or less deep from a surface of the glass (for example, WO2018/056121, WO2017/115811). In a two-stage chemically strengthened glass, a synthesized profile of SLP information and FSM information may be used as a stress profile in a surface layer and an inside part of the glass.

On the other hand, in the present invention, a stress profile measured by the scattered light photoelastic stress meter (SLP) is mainly used in order to examine influence of sodium ions introduced by ion exchange. In the present description, the stress profile measured by the scattered light photoelastic stress meter (SLP) is called "SLP stress profile" or simply "stress profile" to be distinguished from a synthesized profile of SLP information and FSM information, which is called as "synthesized profile" or the like. In addition, values simply called as stress value $CS_x$, tensile stress value CT, depth of a compressive stress layer DOL, etc. mean values in the SLP stress profile.

The scattered light photoelastic stress meter is a stress measuring device including a polarization phase difference varying member, an imaging device, and a computing portion. The polarization phase difference varying member varies a polarization phase difference of laser light by one wavelength or more with respect to the wavelength of the laser light. When the laser light whose polarization phase difference has been varied enters a strengthened glass, scattered light is generated. The scattered light is imaged at predetermined time intervals for a plurality of times by the imaging device to thereby acquire a plurality of images. The computing portion uses the images to measure a periodical luminance change of the scattered light and compute a phase change in the luminance change. Based on the phase change, the computing portion computes a stress distribution in a direction of depth from a surface of the strengthened glass.

An example of a method for measuring a stress profile using the scattered light photoelastic stress meter is described in WO2018/056121. Examples of the scattered light photoelastic stress meter include SLP-1000 and SLP-2000 made by Orihara Manufacturing Co., Ltd. When attached Software SlpIV (Ver. 2019.01.10.001) is combined with those scattered light photoelastic stress meters, stress can be measured precisely.

<Stress Profile>

A stress profile in the chemically strengthened glass according to the present invention is a profile of a stress value $CS_x$ [MPa] at a depth x [μm] from a surface of the glass. The stress value is measured by a scattered-light photoelastic stress meter as described above. The stress profile is characterized in that a second-order differential value $CS_x''$ of the stress value $CS_x$ in the profile satisfies $0<CS_x''\leq 0.050$ in a range of $CS_x \geq 0$.

Figure 1B:
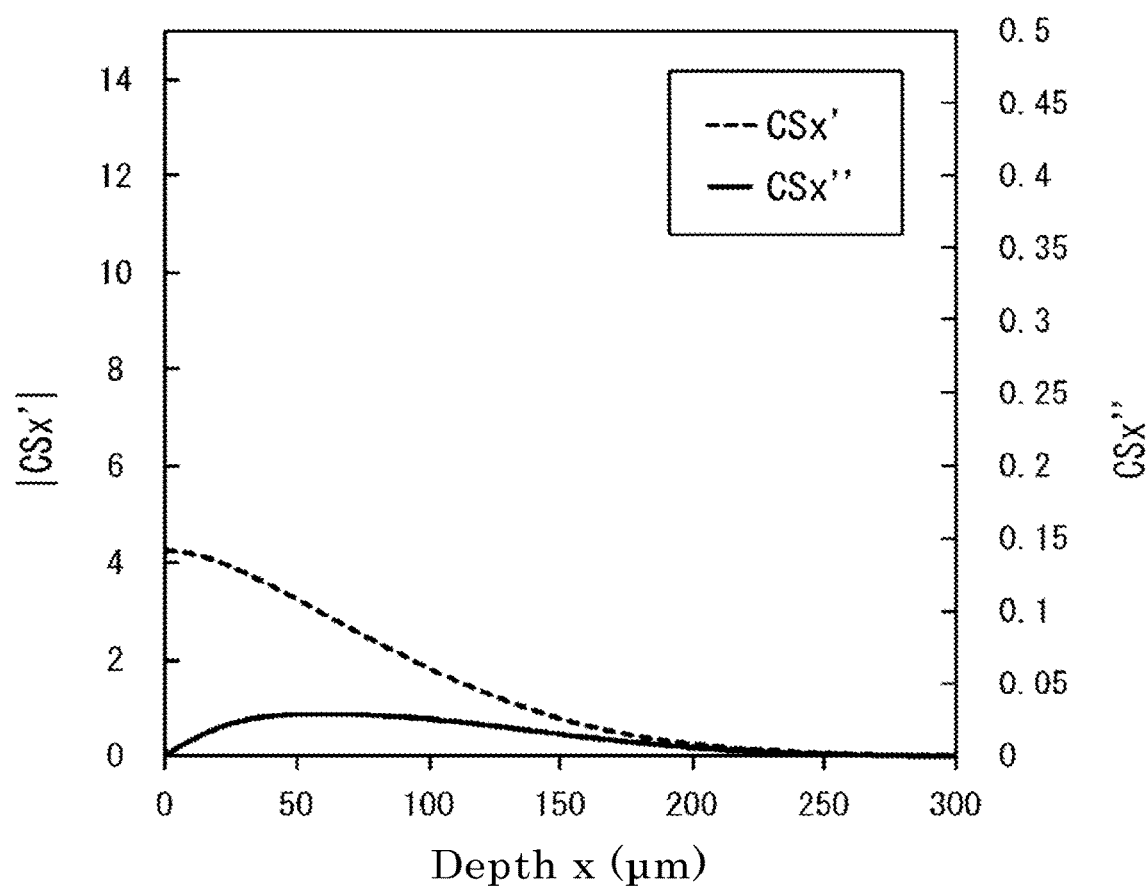
FIG. 1B shows examples of absolute values of a first-order differentiation $CS_x'$ and a second-order differentiation $CS_x''$ in the profile of the stress value $CS_x$ in the present invention.

FIG. 1A shows an example of the stress profile in the chemically strengthened glass according to the present invention. FIG. 1B shows graphs of first and second derivatives of the stress profile in FIG. 1A. As shown in FIG. 1A, the stress value $CS_x$ in the present invention changes depending on the depth x from the surface of the glass. The graph of the first derivative in FIG. 1B is a graph of $CS_x'$ obtained by differentiating $CS_x$ with x. For the sake of visibility, absolute values of $CS_x'$ have been plotted.

The graph of the second derivative is a graph of $CS_x''$ obtained by differentiating $CS_x'$ with x. As shown in FIG. 1B, in the present invention, $CS_x''$ satisfies $0<CS_x''\leq 0.050$ in the range of $CS_x \geq 0$. That is, the present invention is characterized in that the stress profile in the compressive stress layer has a linear shape with no bending point and has a less change amount in stress change.

Due to this shape, as will be described below, a stress value $CS_{50}$ at a depth of 50 μm is increased to improve the cracking resistance against impact at the time of falling in comparison with a conventional chemically strengthened glass which has been strengthened at two stages, while the total value of compressive stress in a compressive stress layer can be reduced. Thus, a stress value in a tensile stress layer appearing in accordance with the total value of the compressive stress can be suppressed to avoid the CT limit.

Here, the stress value $CS_{50}$ at the depth of 50 μm is a value which contributes to improvement in the cracking resistance against impact at the time of falling. When a glass article falls down onto an asphalt-paved road or sands, a crack occurs due to collision with a protrusion of sand or the like. The length of the crack occurring thus depends on the size of the sand against which the glass article collided. When the value of the compressive stress value $CS_{50}$ at the depth of 50 μm from the glass surface, which is measured by the scattered light photoelastic stress meter, is increased, the glass article can have a stress profile in which a large compressive stress value has been, for example, formed near the depth of 50 μm. Thus, the glass article can be prevented from being crushed and broken due to collision with a comparatively large protrusion.

The CT limit in the present description means a value of a maximum tensile stress value CT serving as a border where the number of crushed pieces changes from 10 or less to more than 10 in a crushed-piece number test which will be described later in Examples. The CT limit is a value which can be experimentally obtained in accordance with the kind of glass, and which has negative correlation with the sheet thickness of the glass.

Figure 2:
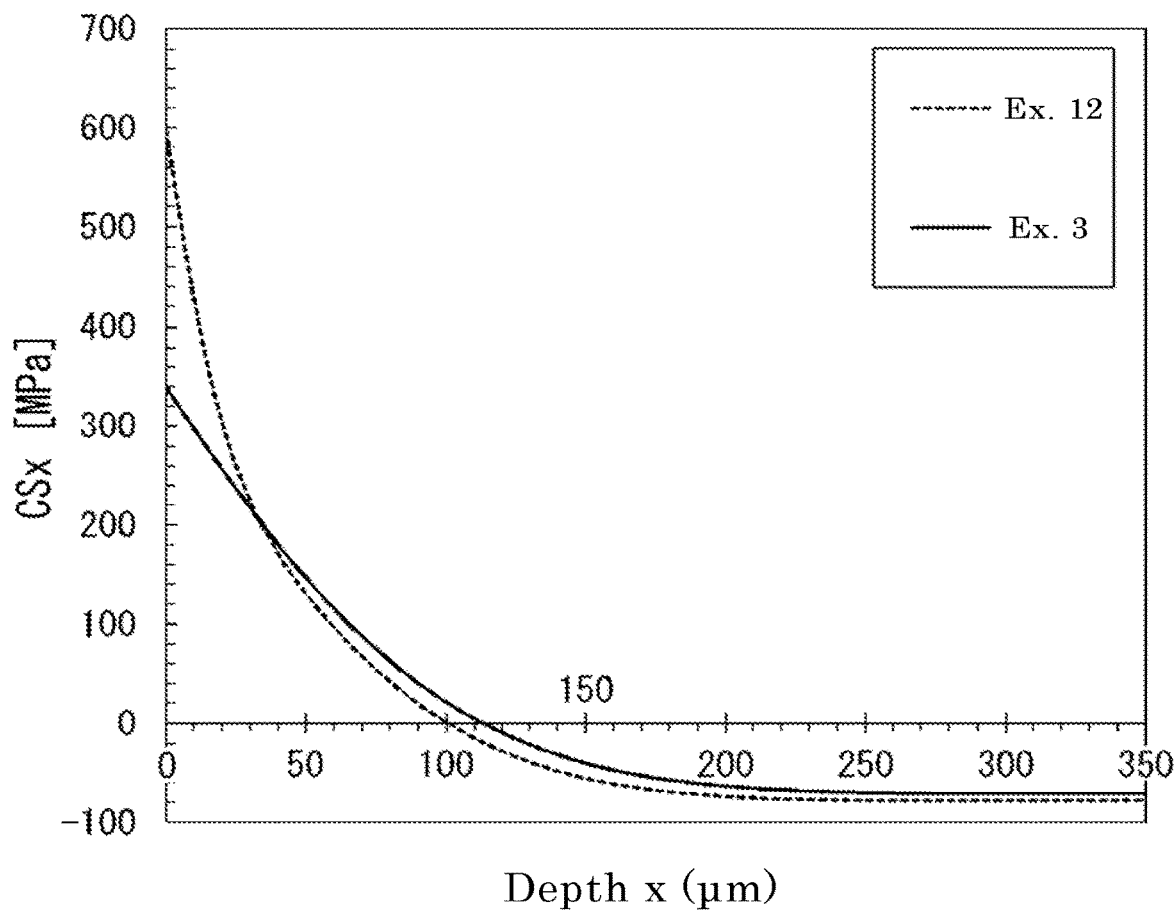
FIG. 2 shows examples of the profile of the stress value $CS_x$ after first ion exchange and after second ion exchange in the present invention.

The stress profile in the chemically strengthened glass according to the present invention is, for example, formed by two stages of chemical strengthening. FIG. 2 shows the stress profile of the chemically strengthened glass according to the present invention, including an example of the stress profile (Ex. 12) after the first stage of the chemical strengthening and an example of the stress profile (Ex. 3) after the second stage of the chemical strengthening. In the first stage of the chemical strengthening, the glass is immersed into molten salt containing potassium ions and sodium ions to thereby cause "Li—Na exchange" and "Na—K exchange" so as to give a compressive stress up to a range beyond the CT limit. In the "Li—Na exchange", lithium ions in the glass are mainly exchanged with the sodium ions in the molten salt. In the "Na—K exchange", the sodium ions in the glass are exchanged with the potassium ions in the molten salt.

In the subsequent second stage of the chemical strengthening, a small amount of lithium ions are added to molten salt containing potassium ions, and the molten salt is used to exchange the sodium in the glass with the potassium in the molten salt (Na—K exchange) while the sodium in the surface layer of the glass is reduced by exchange (Li—Na exchange) between the sodium in the glass and the lithium in the molten salt. Thus, only the stress occurring in the surface layer is relaxed moderately so that the CT limit can be avoided while keeping the stress value $CS_{50}$ at the depth of 50 μm as it is.

Figure 3:
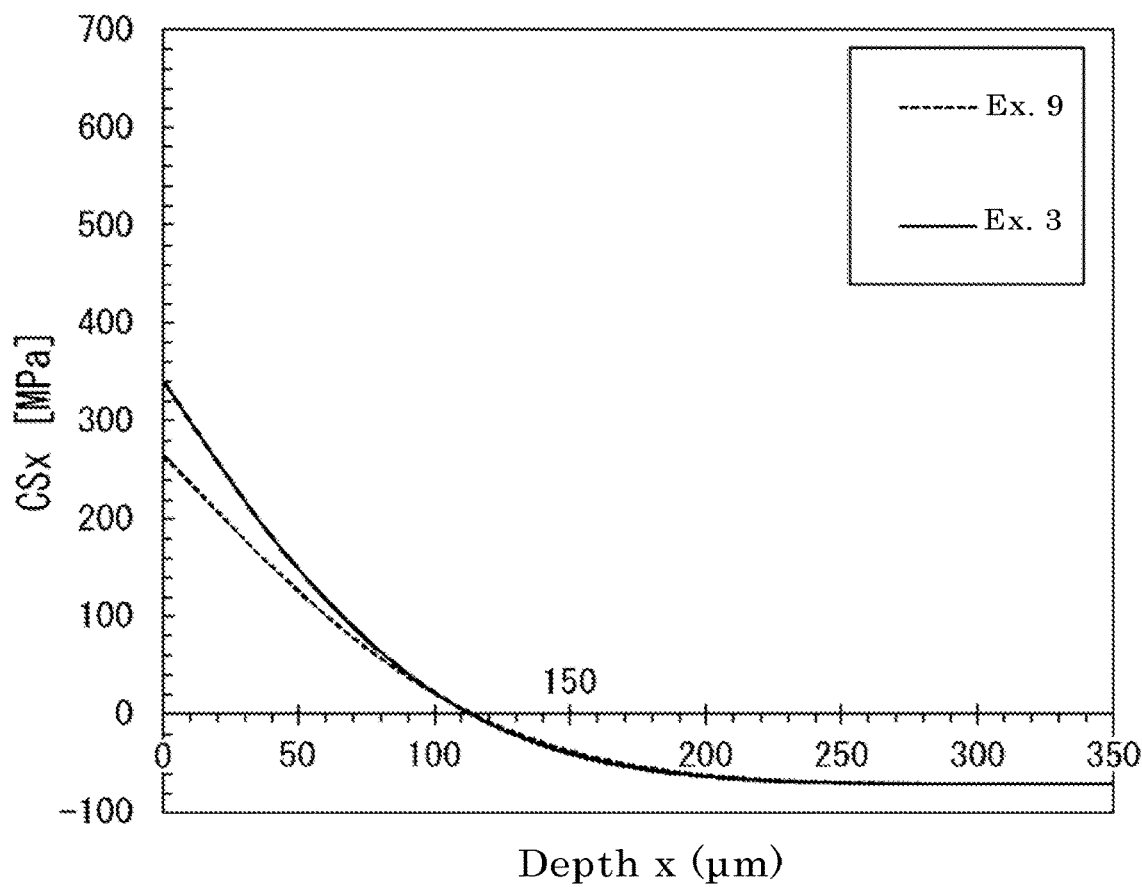
FIG. 3 shows examples of the profile of the stress value $CS_x$ after two-stage chemical strengthening in the present invention and in the background art.
Figure 4A:
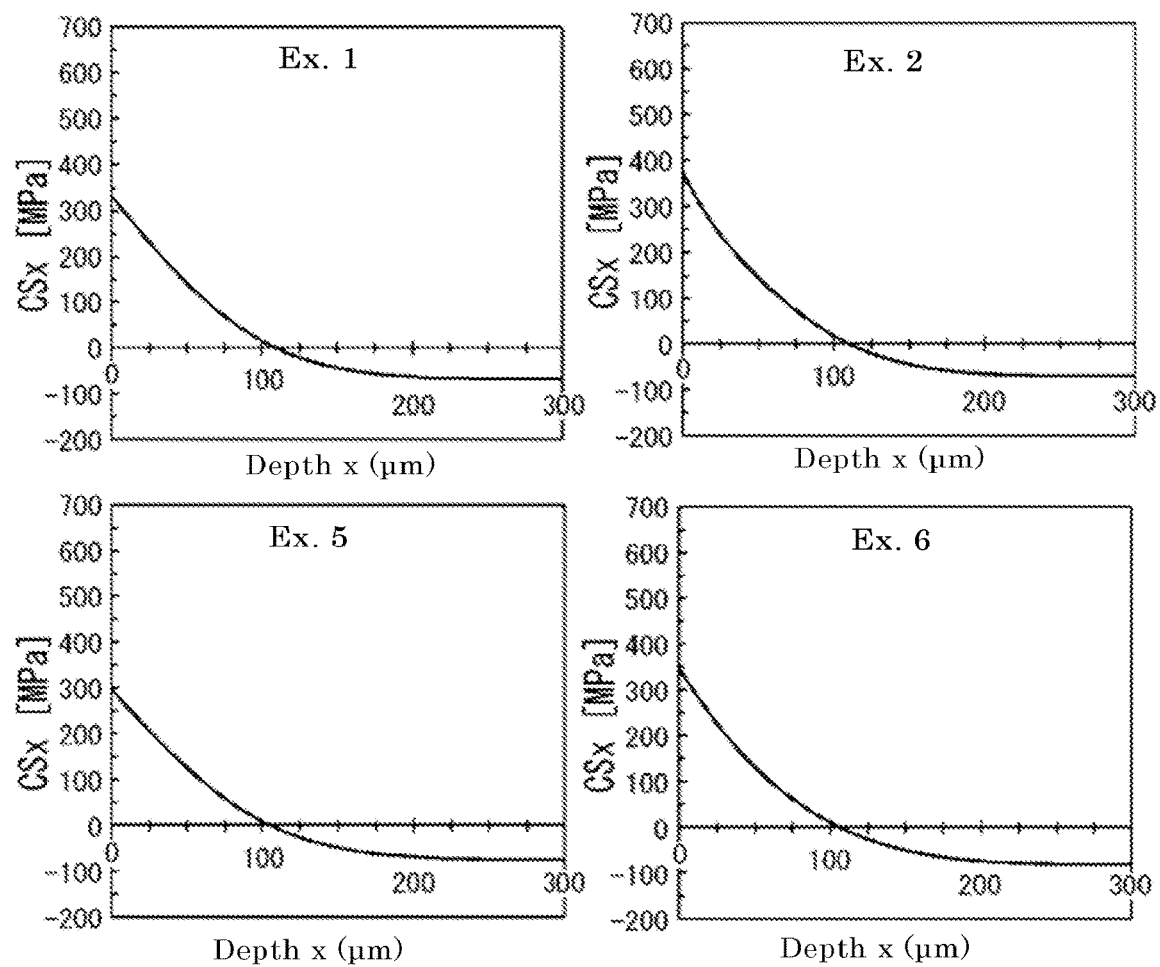
FIG. 4A to FIG. 4D show the profile of the stress value $CS_x$ in Examples.
Figure 4B:
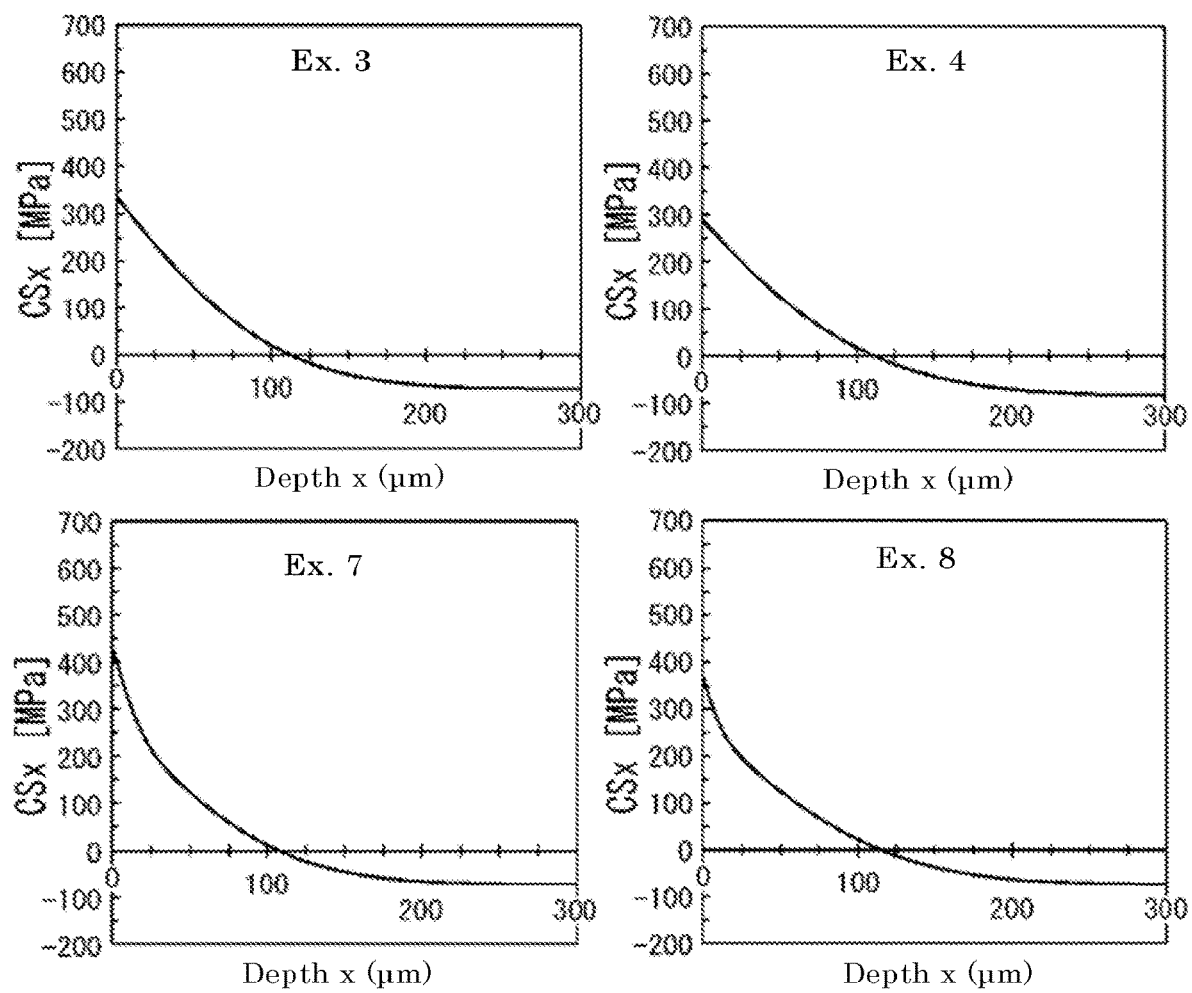
Figure 4C:
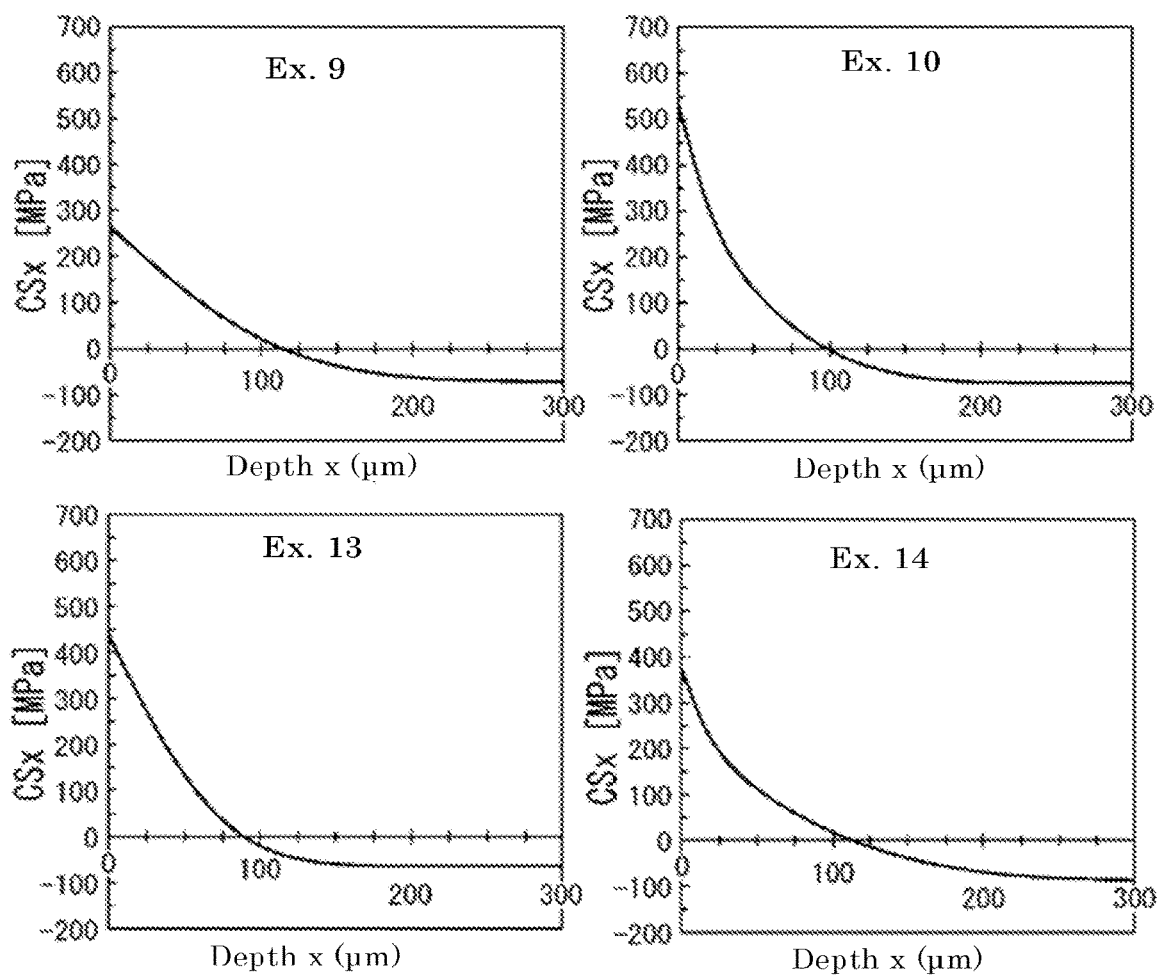
Figure 4D:
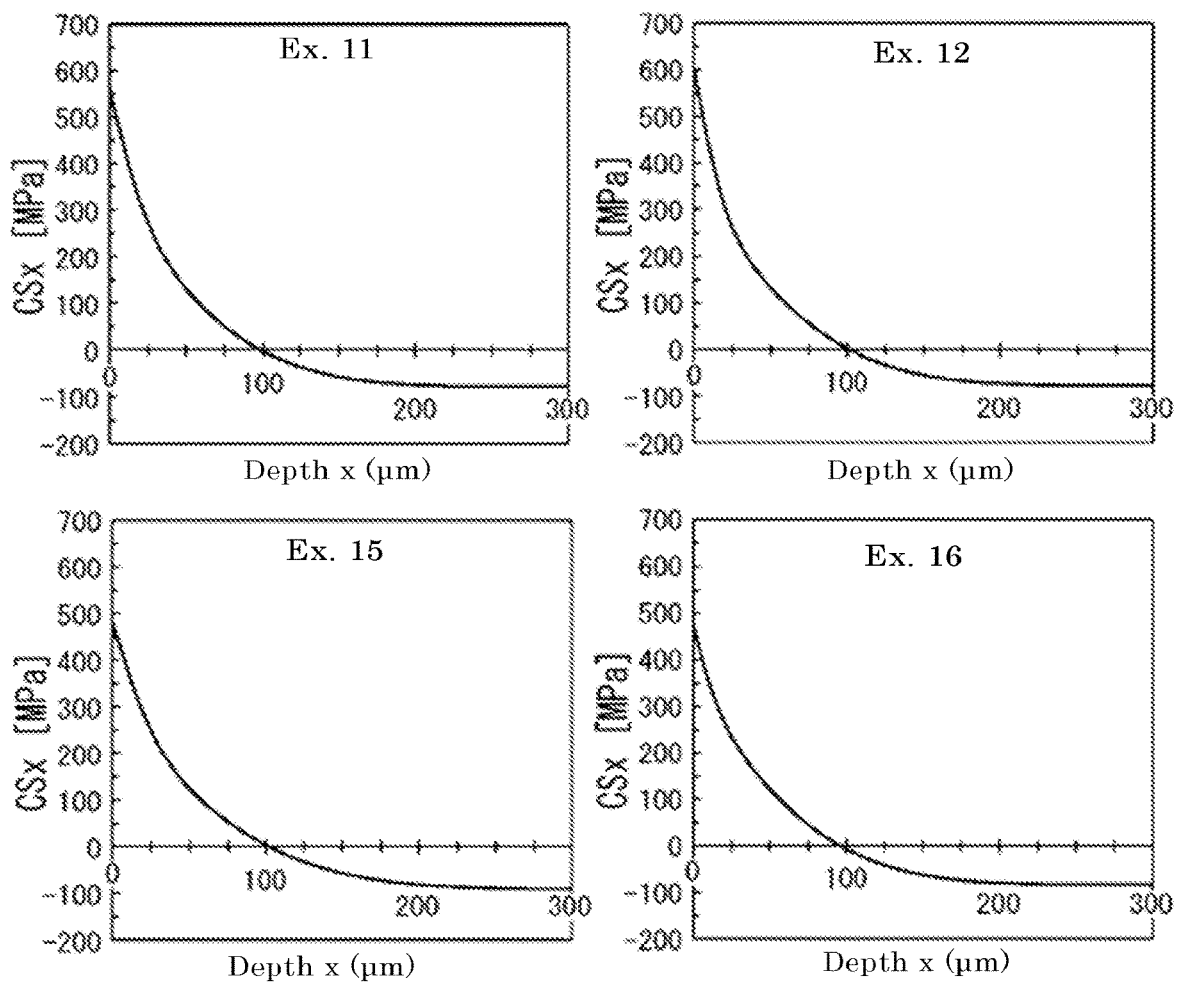
Figure 5A:
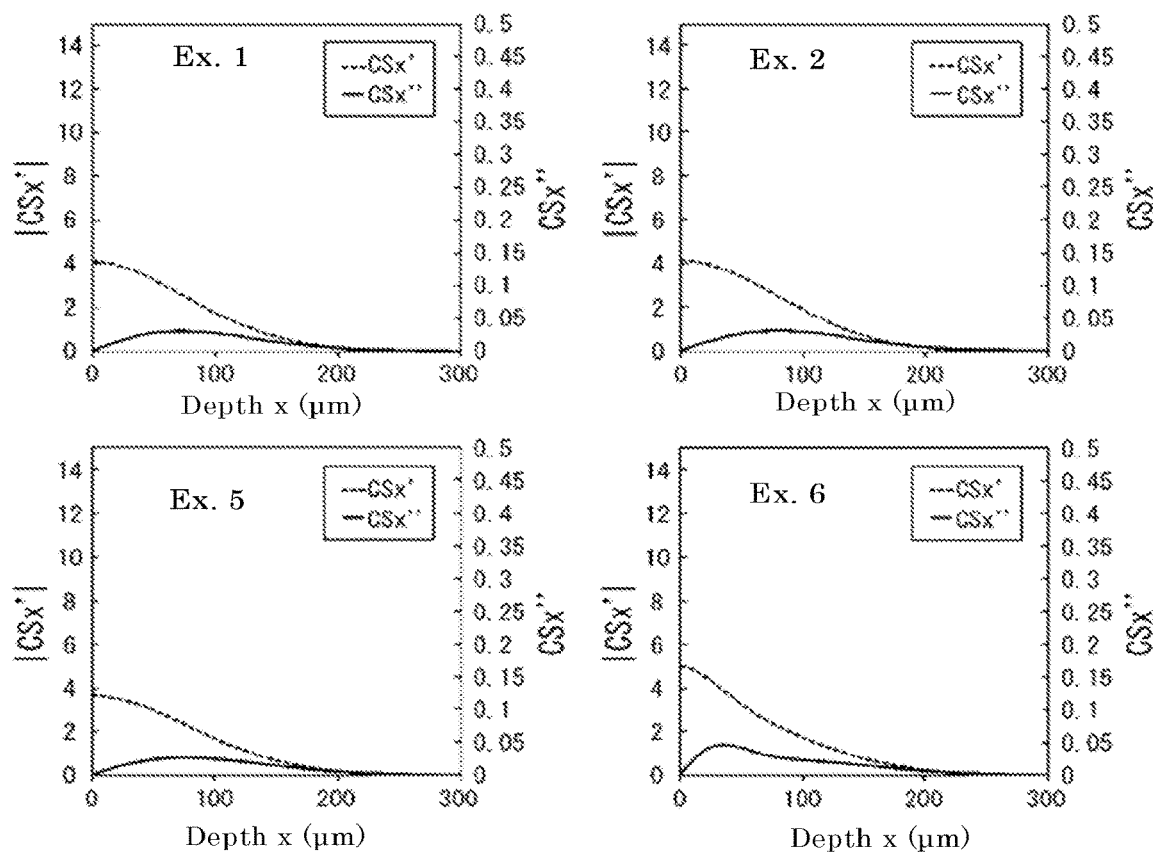
FIG. 5A to FIG. 5D show the absolute values of the first-order differentiation $CS_x'$ and the second-order differentiation $CS_x''$ in the profile of the stress value $CS_x$ in Examples.
Figure 5B:
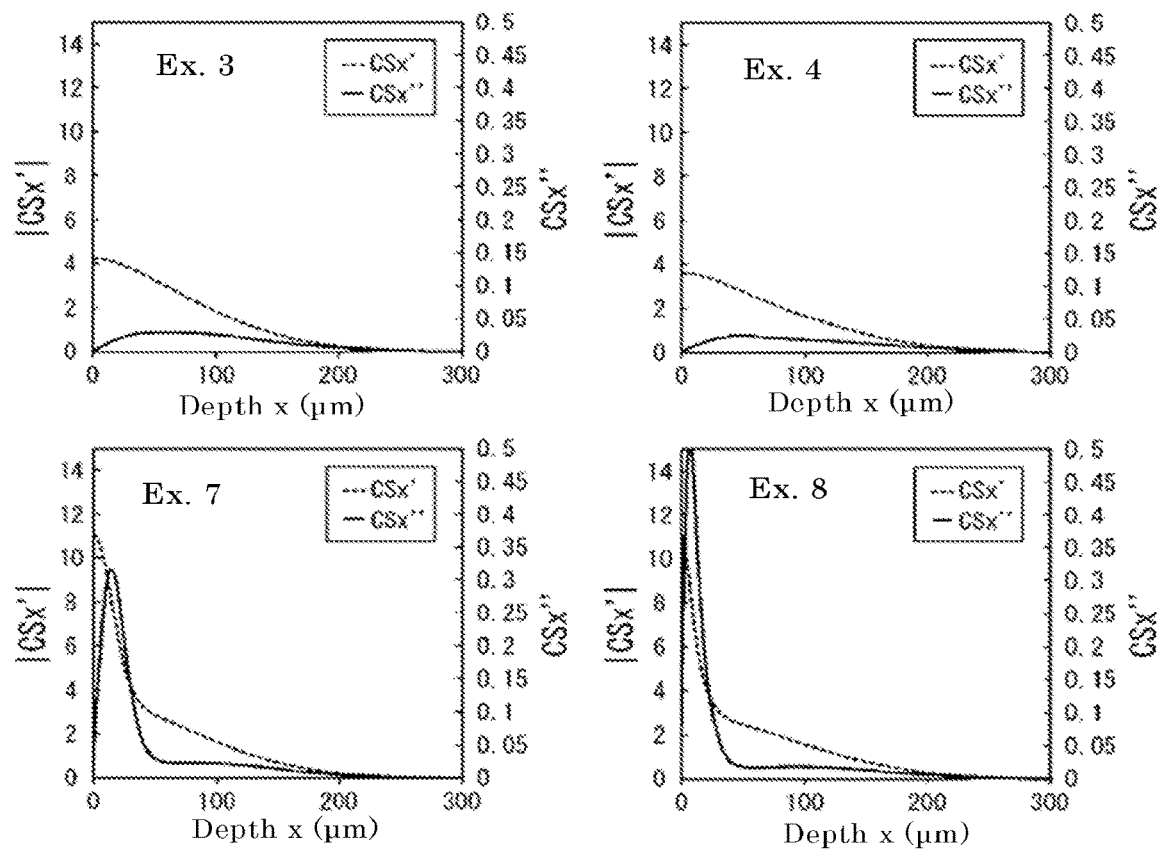
Figure 5C:
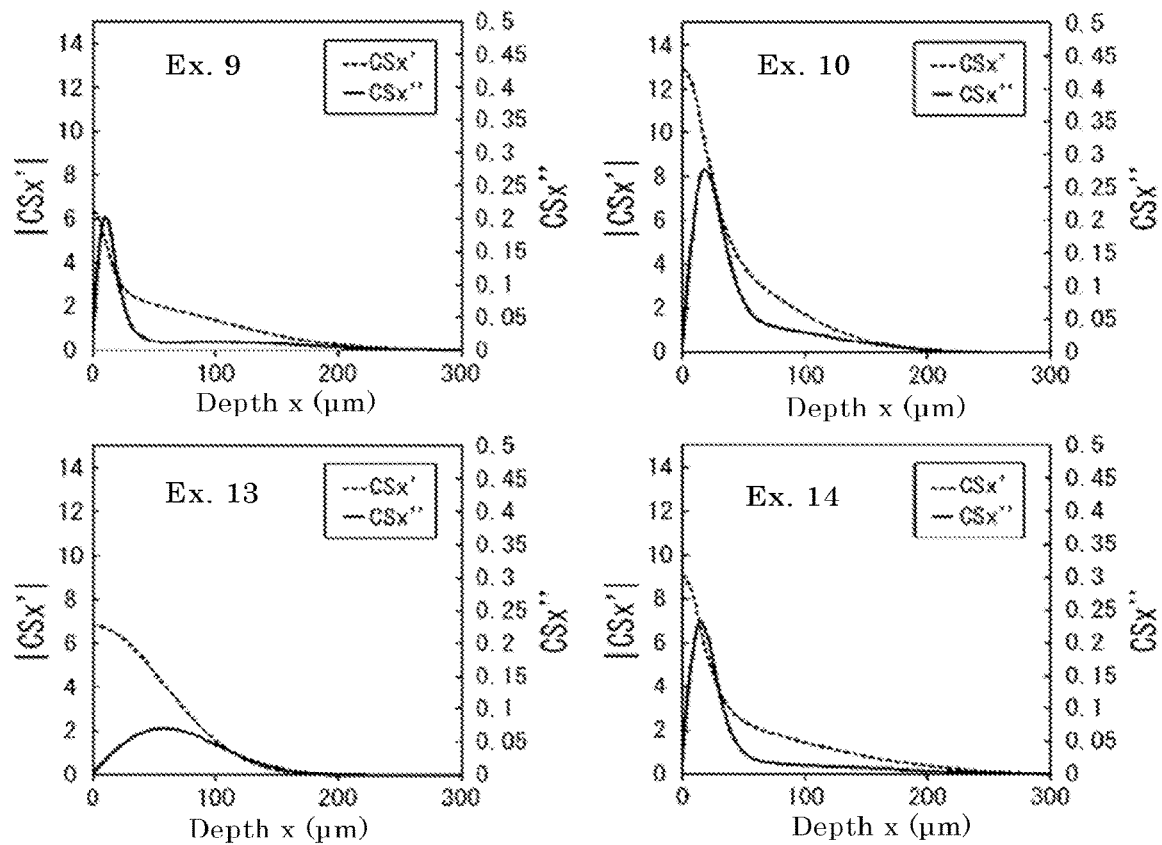
Figure 5D:
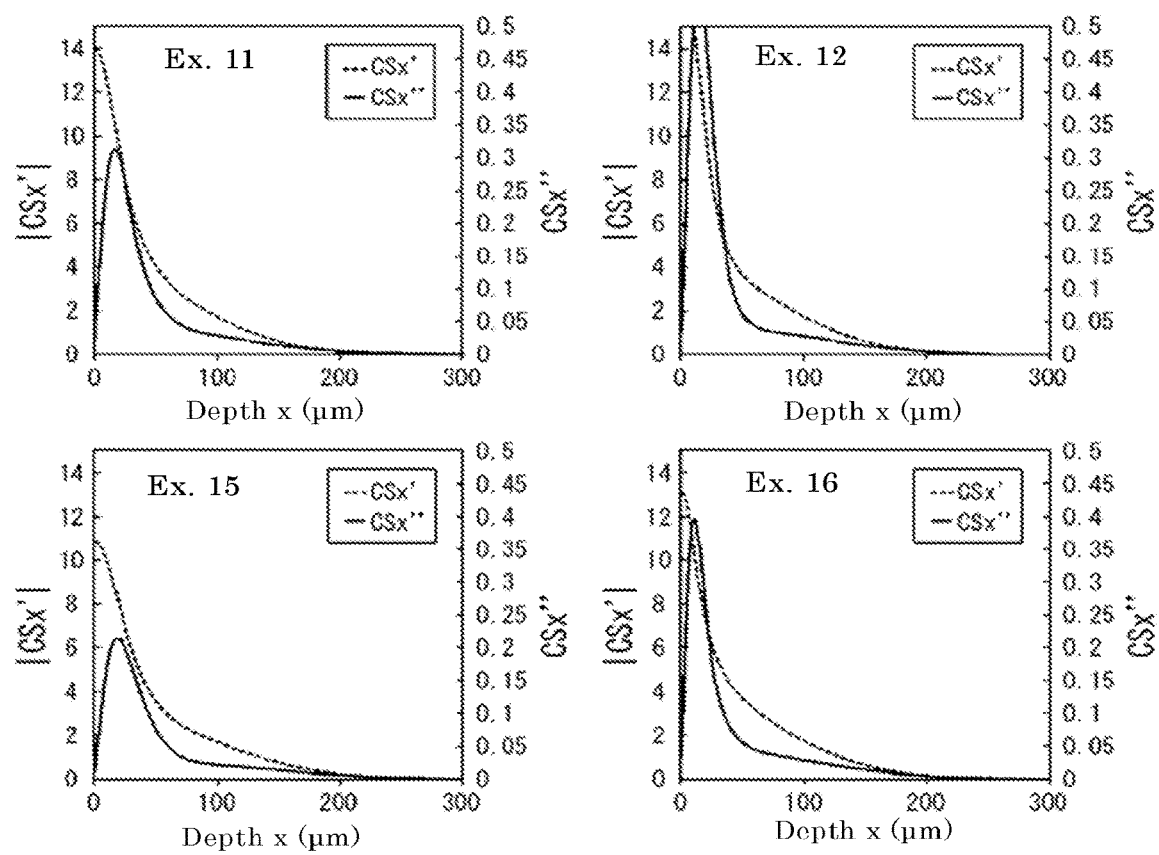
Figure 6:
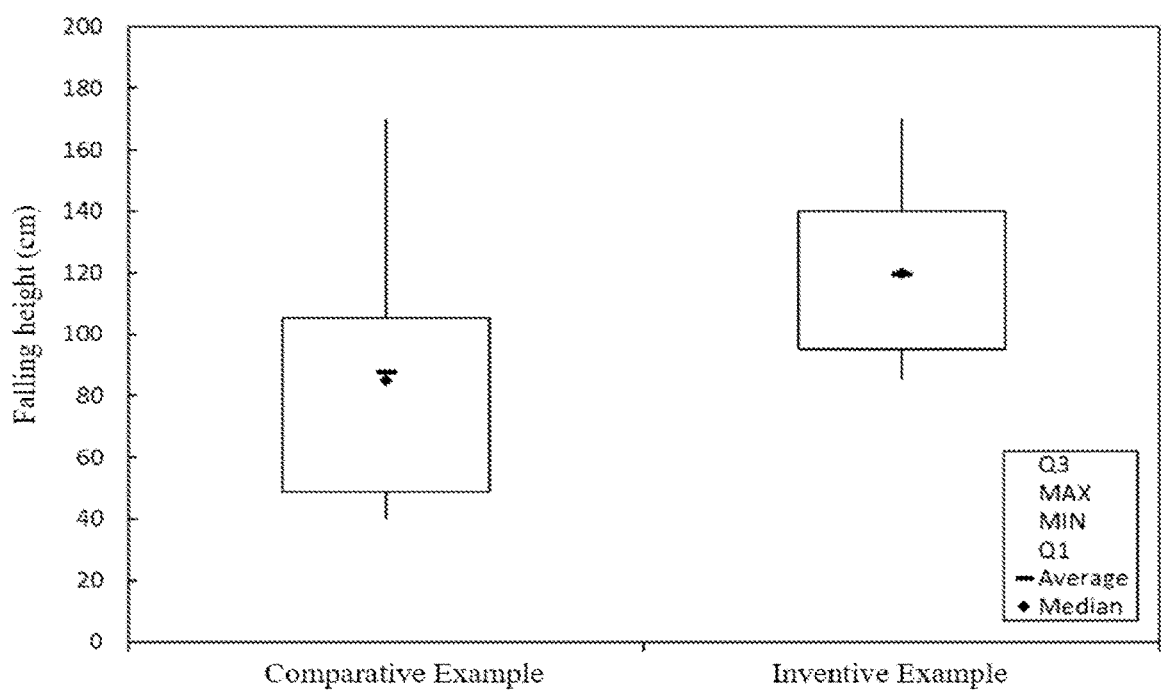
FIG. 6 shows results of falling strength tests in Examples.

FIG. 3 shows an example of the stress profile (Ex. 3) in the chemically strengthened glass according to the present invention in comparison with the conventional two-stage strengthened glass (Ex. 9). As shown in FIG. 3, $CS_{50}$ can be improved according to the present invention in comparison with the conventional two-stage strengthened glass.

As described above, in the chemically strengthened glass according to the present invention, the second-order differential value $CS_x''$ of the stress value $CS_x$ satisfies the relation of $0 < CS_x'' \leq 0.050$ within the range of $CS_x \geq 0$. Thus, the stress profile has a linear shape with no bending point and has a less change amount in stress change. Due to this shape, the stress value $CS_{50}$ at the depth of 50 μm is increased to improve the cracking resistance against impact at the time of falling while the CT limit can be avoided. The present invention will be described in detail below.

<Embodiment of Chemically Strengthened Glass>
(Stress Profile in Embodiment)

The stress profile in the chemically strengthened glass according to the present invention is a profile of the stress value $CS_x$ [MPa] at the depth x [μm] from the surface of the glass, which is measured by the scattered-light photoelastic stress meter. As described above, the stress profile is characterized in that the second-order differential value $CS_x''$ of the stress value $CS_x$ satisfies $0 < CS_x'' \leq 0.050$ in the range of $CS_x \geq 0$. Here, $CS_x''$ is preferably 0.045 or less, more preferably 0.040 or less, and even more preferably 0.035 or less. When $CS_x''$ is within the aforementioned range, the profile has a more linear shape so that the stress value $CS_{50}$ at the depth of 50 μm can be improved effectively. On the other hand, $CS_x''$ is more than 0, and typically 0.005 or more.

The first-order differential value $CS_x'$ of the stress value $CS_x$ is −5.3 or more, more preferably −5.0 or more, and even more preferably −4.5 or more. When the first-order differential value $CS_x'$ is within the aforementioned range, a change in $CS_x'$ is reduced so that the profile of the stress value $CS_x$ can have a linear shape. In addition, with respect to the same $CS_0$, an effect of keeping $CS_{50}$ high can be obtained by the large $CS_x'$. $CS_x'$ is typically −0.5 or less.

As a method for differentiating the stress profile in the present invention, in the profile of $CS_x$, the rate of change in $CS_x$ when the change of x is 0.5 μm is used as the value $CS_x'$, and the rate of change in $CS_x'$ when the change of x is 0.5 μm is used as the value $CS_x''$, as expressed in the following expressions.

$$CS_x' = (CS_{x+0.5} - CS_x)/0.5$$

$$CS_x'' = (CS_{x+0.5}' - CS_x')/0.5$$

As for the value $CS_{50}$ in the chemically strengthened glass according to the present invention, the value of $CS_{50}/(CT \times (t-2\times DOL))/t$ is preferably 4.90 or more, more preferably 5.0 or more, even more preferably 5.1 or more, further more preferably 5.5 or more, and most preferably 6.0 or more when t [mm] designates the thickness, CT designates the maximum tensile stress value, and DOL designates the depth of the compressive stress layer.

There appears a physical phenomenon in which the value $CS_{50}$ increases in accordance with the maximum tensile stress value CT while the maximum tensile stress value CT increases as the sheet thickness is reduced. Accordingly, in order to subtract the influence of the sheet thickness for generalization, comparison is made using the value of $CS_{50}/(CT \times (t-2\times DOL))/t$ as described above. In the chemically strengthened glass according to the present invention, when the value of $CS_{50}/(CT \times (t-2\times DOL))/t$ is 4.90 or more, the falling strength can be improved.

In the chemically strengthened glass according to the present invention, the value of a maximum tensile stress value $CT_2$ [MPa] measured by the scattered light photoelastic stress meter is preferably (−120t+164) or less when t [mm] designates the thickness. When the thickness is t [mm] and the value of $CT_2$ [MPa] is (−120t+164) or less, CT can be a value of CT limit or less, so that the glass can be inhibited from being violently crushed.

On the other hand, the value of the maximum tensile stress value $CT_2$ [MPa] measured by the scattered light photoelastic stress meter is preferably (−120t+150) or more. When the value $CT_2$ [MPa] is (−120t+150) or more, a compressive stress high enough to improve the strength can be introduced in accordance with the compressive stress layer.

In the chemically strengthened glass according to the present invention, the compressive stress value $CS_0$ in the glass surface measured by the scattered light photoelastic stress meter is preferably 400 MPa or less, more preferably 350 MPa or less, and even more preferably 300 MPa or less. When $CS_0$ is 400 MPa or less, the total value of stress in the compressive stress layer can be reduced and the maximum tensile stress value CT can be suppressed to avoid the CT limit.

The value of the depth of compressive stress layer DOL [μm] in the chemically strengthened glass according to the present invention is preferably beyond (100t+25), more preferably (100t+35) or more, and even more preferably (100t+40) when the thickness is t [mm]. When the thickness is t [mm] and the depth of compressive stress layer DOL is beyond (100t+25), compressive stress can be introduced up to a deep part of the glass in the sheet thickness direction thereof, which is advantageous to prevent the glass from being cracked due to collision. In addition, in order to keep balance between the compressive stress and the total amount of tensile stress all over the glass in the sheet thickness direction thereof, the value DOL [μm] is preferably (100t+70) or less, more preferably (100t+60) or less, and even more preferably (100t+55) or less when the thickness is t [mm].

(Base Composition of Chemically Strengthened Glass)

The base composition of the chemically strengthened glass according to the present invention coincides with the composition of the glass which has not been chemically strengthened yet, as will be described later. The base composition is a composition in a region which has not received influence of the ion exchange. Except for a case where an extreme ion exchange treatment is performed, the base composition is a composition in a region which is deeper than the depth of compressive stress layer DOL in the chemically strengthened glass.

<Embodiment of Method for Manufacturing Chemically Strengthened Glass>

A chemical strengthening treatment is a treatment in which a glass is brought into contact with metal salt, for example, by a method of immersing the glass into a melt of the metal salt (such as potassium nitrate) containing metal ions (typically sodium ions or potassium ions) having large ionic radii, so as to replace metal ions (typically lithium ions or sodium ions) having small ionic radii in the glass by the metal ions (typically sodium ions or potassium ions for lithium ions, potassium ions for sodium ions) having large ionic radii in the metal salt.

The method for manufacturing the chemically strengthened glass according to the present invention is characterized as follows.

(Step 1) A lithium-containing glass is immersed into a first molten salt composition in which the concentration of potassium nitrate is higher than the concentration of sodium nitrate, so as to perform first ion exchange.

(Step 2) The lithium-containing glass is immersed into a second molten salt composition in which the concentration of potassium nitrate is 85 mass % or higher, and the mass ratio of sodium ions to lithium ions is 0 or higher and 15 or lower, so as to perform second ion exchange. Each step will be described in detail below.

(Step 1) First Ion Exchange

In the first step in the method for manufacturing the chemically strengthened glass according to the present invention, the lithium-containing glass is immersed into the first molten salt composition containing sodium ions and potassium ions, so as to perform the first ion exchange. The lithium-containing glass to be chemically strengthened will be described in detail later.

In Step 1, due to "Li—Na exchange" in which the lithium ions in the glass are exchanged with the sodium ions in the molten salt, sodium can be introduced up to a deep layer part of the glass to thereby form a deep compressive stress layer. Further, in Step 1, due to the concentration of potassium nitrate higher than the concentration of sodium nitrate in the first molten salt composition, "Na—K exchange" in which the sodium ions in the glass are exchanged with the potassium ions in the molten salt occurs concurrently so as to introduce potassium into a surface layer part of the glass. Thus, in the subsequent second ion exchange, a phenomenon that the sodium in the surface layer of the glass is reduced excessively to lower $CS_{50}$ due to "Na—Li exchange" in which the sodium in the glass is exchanged with lithium in molten salt can be inhibited significantly.

Here, the "molten salt composition" means a composition containing molten salt. Examples of the molten salt contained in the molten salt composition include nitrate, sulfate, carbonate, and chloride. Examples of the nitrate include lithium nitrate, sodium nitrate, potassium nitrate, cesium nitrate, rubidium nitrate, and silver nitrate. Examples of the sulfate include lithium sulfate, sodium sulfate, potassium sulfate, cesium sulfate, rubidium sulfate, and silver sulfate. Examples of the chloride include lithium chloride, sodium chloride, potassium chloride, cesium chloride, rubidium chloride, and silver chloride. Each of those molten salts may be used alone, or a plurality kinds of them may be combined for use.

The molten salt composition is preferably based on nitrate. A composition based on sodium nitrate and potassium nitrate is more preferred. Here, the phrase "based on" means that the content in the molten salt composition is 80 mass % or more. The total content of sodium nitrate and potassium nitrate is preferably 90 mass % or more, and more preferably 100 mass %.

The first ion exchange may employ a mode in which the content of potassium nitrate in the first molten salt composition is beyond 50 mass %. In a first embodiment, the content of potassium nitrate in the first molten salt composition is more preferably 55 mass % or higher, and even more preferably 60 mass % or higher. When the content of potassium nitrate is within the aforementioned range, the phenomenon that sodium in the surface layer of the glass is excessively reduced to lower $CS_{50}$ due to "Na—Li exchange" in the subsequent second ion exchange can be inhibited significantly. On the other hand, the content of potassium nitrate is preferably 80% or lower, and more preferably 70% or lower. When the content of potassium nitrate is within the aforementioned range, sodium ions can be sufficiently introduced into the inside of the glass.

On the other hand, the content of sodium nitrate in the first molten salt composition is lower than 50 mass %. In the first embodiment, the content of sodium nitrate in the first molten salt composition is more preferably 45 mass % or lower, and even more preferably 40 mass % or lower. On the other hand, the content of sodium nitrate is preferably 20% or higher, and more preferably 30% or higher. When the content of sodium nitrate is within the aforementioned range, sodium ions can be sufficiently introduced into the inside of the glass.

In the manufacturing method of the present invention, a maximum tensile stress value $CT_1$ of the stress profile formed inside the glass by the first ion exchange is preferably larger than the CT limit. When the maximum tensile stress value $CT_1$ after the first ion exchange is larger than the CT limit, a sufficient compressive stress can be introduced by the first ion exchange. Thus, in the subsequent second ion exchange step, $CS_{50}$ can be kept high even after the stress value in the surface layer of the glass is reduced.

More preferably, the ion exchange is performed so that the maximum tensile stress value $CT_1$ in the chemically strengthened glass after the first ion exchange exceeds $(-120t+164)$. When the maximum tensile stress value $CT_1$ is larger than $(-120t+164)$, the compressive stress can be introduced beyond the CT limit.

In Step 1, it is preferable to immerse the lithium-containing glass into the first molten salt composition whose temperature is preferably 380° C. or higher. When the temperature of the first molten salt composition is 380° C. or higher, the ion exchange proceeds easily so that the compressive stress can be introduced up to a range exceeding the CT limit. The temperature of the first molten salt composition is more preferably 421° C. or higher, and even more preferably 430° C. or higher. On the other hand, the temperature of the first molten salt composition is normally 450° C. or lower in terms of danger due to evaporation and change in composition of the molten salt.

In Step 1, preferably the time for which the lithium-containing glass is immersed in the first molten salt composition is 0.5 hours or more. When the immersion time is 0.5 hours or more, the surface compressive stress can be increased. The immersion time is more preferably 1 hour or more. When the immersion time is too long, the productivity decreases, and further the compressive stress may be lowered due to a relaxation phenomenon. Therefore, the immersion time is normally 8 hours or less.

(Step 2) Second Ion Exchange

Step 2 is a step of second ion exchange in which the glass subjected to the first ion exchange treatment in Step 1 is immersed into the second molten salt composition containing potassium nitrate as a base and containing a small amount of lithium ions, so as to perform second ion exchange. In the second ion exchange, "Na—K exchange" in which the sodium ions in the glass are exchanged with potassium ions occurs so that the potassium ions are introduced into a region of several tens of μm in the surface layer part of the glass. Concurrently, sodium ions in the surface layer part of the glass are reduced by "Na—Li exchange" to relax the compressive stress caused by the sodium ions. In the second ion exchange, the compressive stress in the chemically strengthened glass is relaxed while keeping $CS_{50}$ as it is, and adjusted not to exceed the CT limit. Influence of the stress in the surface layer part of the glass where the potassium ions have been introduced is not reflected on the stress profile measured by the SLP. Accordingly, reduction in tensile stress caused by the reduction of the sodium ions can be confirmed by use of the stress profile measured by the SLP.

The concentration of potassium nitrate in the second molten salt composition is 85 mass % or higher, more preferably 90 mass % or higher, and even more preferably 95 mass % or higher. The upper limit of the concentration of potassium nitrate is not particularly limited, but it is normally 99.9 mass % or lower. Further, the mass ratio of sodium ions to lithium ions in the second molten salt composition is 0 or higher and 15 or lower. The fact that the mass ratio of sodium ions to lithium ions in the second molten salt composition is within the aforementioned range means that lithium ions have been intentionally added into the molten salt composition. For example, when sodium nitrate is added to the second molten salt composition, lithium ions in the glass are exchanged with the sodium ions in the second molten salt composition (Li—Na exchange) so that the lithium ions are mixed into the second molten salt composition. The amount of the lithium ions mixed on this occasion increases in accordance with the amount of sodium ions in the molten salt. On the other hand, exchange (Na—Li exchange) between sodium ions in the glass and the lithium ions mixed into the molten salt is inhibited by the sodium ions in the molten salt. Accordingly, in the manufacturing method of the present invention, by intentionally adding lithium ions at the amount which is more than the amount mixed due to addition of sodium nitrates, exchange (Na—Li exchange) between sodium ions in the glass and lithium ions in the molten salt is effectively caused so that the compressive stress appearing in the surface layer of the glass in Step (1) can be weakened.

The second molten salt composition preferably contains 0.1 mass % or higher and 10 mass % or lower of lithium nitrate. When the second molten salt composition contains lithium nitrate within the aforementioned range, exchange between sodium ions introduced to the vicinities of the glass surface in Step (1) and the lithium ions in the second molten salt composition occurs in parallel with exchange between the sodium ions and potassium ions in the second molten salt composition so that the stress in the glass surface can be weakened. The content of lithium nitrate in the second molten salt composition is more preferably 0.3 mass % or higher and 5 mass % or lower, and even more preferably 0.5 mass % or higher and 2.5 mass % or lower.

The second molten salt composition may contain sodium nitrate. The concentration of sodium nitrate, if contained, is preferably higher than 0.1 mass %, and more preferably 0.5 mass % or higher. When the content of sodium nitrate is within the aforementioned range, the effect of increasing $CS_{50}$ is improved. Due to the presence of sodium ions in the second molten salt, the Li—Na exchange proceeds also in the second ion exchange to thereby improve $CS_{50}$. Further, when the content of sodium nitrate is within the aforementioned range, the time for which the effect of the present invention is exhibited can be prolonged without replacing the second molten salt, and thus the glass treating amount can be increased. The concentration of sodium nitrate in the second molten salt composition is preferably 5 mass % or lower, more preferably 3 mass % or lower, even more preferably 2 mass % or lower, and most preferably 1 mass % or lower. When the concentration of sodium nitrate is within the aforementioned range, the value $CT_2$ can be easily suppressed to be within the CT limit.

The second molten salt composition may further contain additives other than nitrate. Examples of the additives include silicic acid, and specific inorganic salts. When the second molten salt composition contains such additives, $CS_0$ in the synthesized profile of FSM and SLP can be increased. Detailed description will be made below.

The second molten salt composition may contain silicic acid as additive. The silicic acid designates a compound consisting of silicon, hydrogen and oxygen and expressed by the chemical formula $nSiO_2 \cdot xH_2O$. Here, n and x are natural numbers. Examples of such silicic acid include metasilicic acid ($SiO_2 \cdot H_2O$), metadisilicic acid ($2SiO_2 \cdot H_2O$), orthosilicic acid ($SiO_2 \cdot 2H_2O$), pyrosilicic acid ($2SiO_2 \cdot 3H_2O$), silica gel [$SiO_2 \cdot mH_2O$ (m is a real number of 0.1 to 1)], etc.

When silicic acid is contained, the silicic acid adsorbs lithium ions to make potassium ions easily enter the glass, and thus the stress at several μm deep in the surface layer in the synthesized profile of FSM and SLP can be increased while suppressing CT. The lithium ions react with sodium ions through "Na—Li exchange" and thus can inhibit proceeding of "Na—K exchange". Therefore, silicic acid may be added to promote the "Na—K exchange". The addition amount of silicic acid is preferably 0.1 mass % or higher, more preferably 0.3 mass % or higher, and most preferably 0.5 mass % or higher. On the other hand, the addition amount of silicic acid is preferably 3 mass % or lower, more preferably 2 mass % or lower, and most preferably 1 mass % or lower. When the addition amount of silicic acid is within the aforementioned range, the stress in the surface layer in the SLP stress profile can be reduced significantly due to "Na—Li exchange". That is, it is possible to achieve the effect of raising compressive stress in the synthesized profile at several μm in the surface layer due to introduction of potassium, and the effect of reducing stress up to DOL in the SLP profile due to reduction of sodium.

The silicic acid is preferably silica gel [$SiO_2 \cdot mH_2O$ (m is a real number of 0.1 to 1)]. The silica gel has comparatively large secondary particles. Accordingly, there is a merit that the silica gel settles easily in the molten salt and can be charged and recovered easily. In addition, there is no concern of scattering dust, and thus it is possible to secure safety of workers. Further, the silica gel is a porous material and the molten salt can be easily supplied to surfaces of primary particles of the silica gel. Therefore, the silica gel is excellent in reactivity and effective in adsorbing lithium ions.

The second molten salt may contain specific inorganic salt (hereinafter referred to as fusing agent) as additive. The fusing agent is preferably carbonate, hydrogencarbonate, phosphate, sulfate, hydroxide, or chloride. The fusing agent preferably contains at least one kind of salt selected from the group consisting of $K_2CO_3$, $Na_2CO_3$, $KHCO_3$, $NaHCO_3$, K$_3$PO$_4$, Na$_3$PO$_4$, K$_2$SO$_4$, Na$_2$SO$_4$, KOH, NaOH, KCl, and NaCl. Particularly, more preferably the fusing agent contains at least one kind of salt selected from the group consisting of K$_2$CO$_3$ and Na$_2$CO$_3$. Even more preferably the fusing agent is K$_2$CO$_3$.

The lithium ions in the second molten salt can weaken the compressive stress derived from the sodium in the glass by "Na—Li exchange". On the other hand, the lithium ions in the second molten salt can impede "Na—K exchange". When "Na—K exchange" is impeded, the effect of introducing potassium up to a depth of several μm in the surface layer of the glass to thereby increase CS$_0$ in the synthesized profile cannot be obtained easily. Here in the second molten salt, lithium ions, sodium ions and potassium ions are higher in this order as to interaction energy with anions generated from the fusing agent. When the second molten salt contains the fusing agent, the anions can attract the lithium ions to inhibit the lithium ions from impeding "Na—K exchange". Thus, potassium can be introduced into the glass easily. On the other hand, as the anions do not inhibit "Na—Li exchange", the stress derived from the sodium in the glass can be weakened. In this manner, it is possible to obtain the effect of increasing CS$_0$ in the synthesized profile while keeping the effect of weakening the compressive stress from the surface layer of the glass to DOL in the SLP profile.

In order to easily obtain the effect of increasing CS$_0$, the fusing agent is preferably 0.1 wt % or higher. On the other hand, in order to inhibit the properties of the glass surface from changing, the fusing agent is preferably 2 wt % or lower, and more preferably 1 wt % or lower.

The second molten salt composition contains preferably either the silicic acid or the carbonate. More preferably the second molten salt composition contains both the silicic acid and the carbonate to easily obtain the effect of increasing CS$_0$.

In Step 2, it is preferable to immerse the lithium-containing glass into the second molten salt composition at 380° C. or higher. When the temperature of the second molten salt composition is 380° C. or higher, ion exchange can proceed easily. On the other hand, the temperature of the second molten salt composition is normally 450° C. or lower in terms of danger due to evaporation and change in composition of the molten salt, and more preferably 400° C. or lower in order to prevent excessive reduction of stress caused by "Na—Li exchange".

In Step 2, when the time for which the lithium-containing glass is immersed in the second molten salt composition is set at 0.1 hour or more, exchange between the sodium ions introduced to the vicinities of the glass surface in Step (1) and the lithium ions in the second molten salt composition occurs sufficiently to thereby weaken the stress in the glass surface easily. The immersion time is more preferably 0.3 hours or more. The immersion time is preferably 3 hours or less in order to prevent the stress from being excessively reduced by "Na—Li exchange".

Preferably the time t2 (min) for which the lithium-containing glass is immersed in the second molten salt composition satisfies the following expression with respect to the temperature T (° C.) of the second molten salt composition. By satisfying the expression, the stress in the glass surface can be weakened moderately.

$$-0.35T+173 < t2 < -1.4T+650$$

The time t2 (min) is preferably beyond (−0.38T+173), more preferably (−0.36T+167) or more, and even more preferably (−0.35T+167) or more. On the other hand, t2 (min) is preferably below (−1.4T+650), more preferably (−1.3T+600) or less, and even more preferably (−1.2T+550) or less.

In Step 2, it is preferable to adjust the temperature and the immersion time of the second molten salt composition to which the lithium-containing glass is immersed. Specifically when the temperature of the second molten salt composition to which the lithium-containing glass is immersed is, for example, 380° C., the immersion time is preferably 10 minutes or more and 120 minutes or less. When the temperature of the second molten salt composition to which the lithium-containing glass is immersed is 390° C., the immersion time is preferably 7 minutes or more and 100 minutes or less. When the temperature of the second molten salt composition to which the lithium-containing glass is immersed is 400° C., the immersion time is preferably 5 minutes or more and 60 minutes or less. When the temperature of the second molten salt composition to which the lithium-containing glass is immersed is higher than 400° C., the immersion time is preferably 60 minutes or less.

As described above, the second ion exchange is preferably performed so that the maximum tensile stress value CT$_2$ in the chemically strengthened glass after the second ion exchange is not higher than the CT limit.

Further, chemical strengthening is preferably performed so that the maximum tensile stress value CT$_2$ [MPa] in the chemically strengthened glass after the second ion exchange is a value corresponding to 50 to 93% of the maximum tensile stress value CT$_1$ in the chemically strengthened glass after the first ion exchange. The maximum tensile stress value CT$_2$ is more preferably 60% or higher, and even more preferably 75% or higher. On the other hand, the maximum tensile stress value CT$_2$ is preferably 90% or lower.

More preferably, chemical strengthening is performed so that the maximum tensile stress value CT$_2$ [MPa] after the second ion exchange is (−120t+164) or less.

(Third or Following Ion Exchange Step)

In the manufacturing method according to the present invention, ion exchange treatment may be further performed a plurality of times before and after Step 2. For example, in a case of performing third ion exchange after Step 2, chemical strengthening is preferably performed at 380° C. to 420° C. for 5 to 30 minutes using a molten salt composition containing 95 mass % or higher of potassium nitrate. The concentration of potassium nitrate in this case is preferably 95 mass % or higher, more preferably 97 mass % or higher, and even more preferably 99 mass % or higher. When the third ion exchange is performed thus, the effect of increasing the compressive stress in the outermost surface layer in the synthesized profile can be obtained.

(Lithium-Containing Glass)

In the method for manufacturing the chemically strengthened glass according to the present invention, the lithium-containing glass is chemically strengthened. The glass for chemical strengthening in the present invention is preferably a lithium aluminosilicate glass. The glass for chemical strengthening in the present invention may be a crystallized glass or may be an amorphous glass.

More specifically the lithium-containing glass is preferably a lithium aluminosilicate glass which has a composition containing, by mol % in terms of oxides:

52 to 75% of SiO$_2$;
8 to 20% of Al$_2$O$_3$; and
5 to 16% of LiO$_2$.

The word "to" designating a numerical value range in the present description is used as a range including the numerical values before and after the word as a lower limit value and an upper limit value. The word "to" in the following description will be used in the same manner unless otherwise mentioned.

In the present description, the glass composition is expressed by mol % in terms of oxides unless otherwise mentioned, and mol % is simply denoted as "%". In addition, the phrase "substantially not contained" in the glass composition in the present description means that the content is not higher than the level of impurities contained in its raw materials and the like, that is, it is not intentionally contained. Specifically, the content is, for example, lower than 0.1%.

A preferred glass composition will be described below.

$SiO_2$ is a component which forms a framework of the glass. In addition, it is a component which can increase chemical durability, and a component which can reduce occurrence of cracking when the glass surface is damaged.

The content of $SiO_2$ is preferably 55% or higher, more preferably 60% or higher, and particularly preferably 65% or higher. On the other hand, in order to improve meltability, the content of $SiO_2$ is preferably 75% or lower, more preferably 72% or lower, even more preferably 70% or lower, and particularly preferably 68% or lower.

$Al_2O_3$ is a component which is effective in improving ion exchange performance in chemical strengthening to thereby increase the surface compressive stress after the strengthening.

The content of $Al_2O_3$ is preferably 8% or higher, more preferably 9% or higher, even more preferably 10% or higher, particularly preferably 11% or higher, and typically 12% or higher. On the other hand, when the content of $Al_2O_3$ is too high, a crystal tends to grow during its melting, so that the yield may be lowered easily due to a defect of devitrification. In addition, the viscosity of the glass increases to lower the meltability. The content of $Al_2O_3$ is preferably 20% or lower, more preferably 19% or lower, and even more preferably 18% or lower.

$SiO_2$ and $Al_2O_3$ are components which can stabilize the structure of the glass. In order to reduce the brittleness, the total content of them is preferably 65% or higher, more preferably 70% or higher, and even more preferably 75% or higher.

$Li_2O$ is a component which can form a surface compressive stress by ion exchange, and a component which can improve the meltability of the glass. When the chemically strengthened glass contains $Li_2O$, a stress profile large in surface compressive stress and large in compressive stress layer can be obtained by a method in which lithium ions in the glass surface are ion-exchanged with sodium ions, and further the sodium ions are ion-exchanged with potassium ions. In order to easily obtain a preferred stress profile, the content of $Li_2O$ is preferably 5% or higher, more preferably 7% or higher, even more preferably 9% or higher, particularly preferably 10% or higher, and most preferably 11% or higher.

On the other hand, when the content of $Li_2O$ is too high, the crystal growth rate during forming of the glass is increased to make the problem that the yield is reduced due to a defect of devitrification bigger. The content of $Li_2O$ is preferably 20% or lower, more preferably 16% or lower, even more preferably 14% or lower, and particularly preferably 12% or lower.

Although each of $Na_2O$ and $K_2O$ is not essential, it is a component which can improve the meltability of the glass and reduce the crystal growth rate of the glass and the total content of them is preferably 2% or higher in order to improve the ion exchange performance. On the other hand, the total content of them is preferably 10% or lower, more preferably 9% or lower, even more preferably 8% or lower, further more preferably 7% or lower, and particularly preferably 5% or lower.

$Na_2O$ is a component which can form a surface compressive stress layer in the chemical strengthening treatment using potassium salt, and a component which can improve the meltability of the glass. In order to obtain those effects, the content of $Na_2O$ is preferably 1% or higher, more preferably 2% or higher, even more preferably 3% or higher, and particularly preferably 4% or higher. On the other hand, in order to avoid reduction of the surface compressive stress (CS) in the strengthening treatment by sodium salt, and in order to obtain a linear profile with high $CS_{50}$ and with no bending point, the content of $Na_2O$ is preferably 8% or lower, more preferably 7% or lower, even more preferably 6% or lower, and particularly preferably 5% or lower.

$K_2O$ may be contained for the sake of improvement in ion exchange performance or the like. The content of $K_2O$, if contained, is preferably 0.1% or higher, more preferably 0.15% or higher, and particularly preferably 0.2% or higher. In order to prevent devitrification, the content of $K_2O$ is preferably 0.5% or higher, and more preferably 1.2% or higher. On the other hand, a rich content of K causes brittleness or reduction in surface layer stress due to reverse exchange during strengthening. Therefore, the content of $K_2O$ is preferably 5% or lower, and more preferably 3% or lower.

MgO may be contained for the sake of reduction in viscosity during melting or the like. The content of MgO is preferably 1% or higher, more preferably 2% or higher, and even more preferably 3% or higher. On the other hand, when the content of MgO is too high, it is difficult to increase the compressive stress value during the chemical strengthening treatment. The content of MgO is preferably 15% or lower, more preferably 10% or lower, even more preferably 8% or lower, and particularly preferably 6% or lower.

$ZrO_2$ does not have to be contained. However, in order to increase the surface compressive stress of the chemically strengthened glass, it is preferable to contain $ZrO_2$. The content of $ZrO_2$ is preferably 0.1% or higher, more preferably 0.15% or higher, even more preferably 0.2% or higher, particularly preferably 0.25% or higher, and typically 0.3% or higher. On the other hand, when the content of $ZrO_2$ is too high, a defect of devitrification tends to occur and it is difficult to increase the compressive stress value during the chemical strengthening treatment. The content of $ZrO_2$ is preferably 2% or lower, more preferably 1.5% or lower, even more preferably 1% or lower, and particularly preferably 0.8% or lower.

The content of $Y_2O_3$ is preferably 0.1% or higher, more preferably 0.2% or higher, even more preferably 0.5% or higher, and particularly preferably 1% or higher. On the other hand, when $Y_2O_3$ is too rich, it is difficult to increase the compressive stress value during the chemical strengthening treatment. The content of $Y_2O_3$ is preferably 5% or lower, more preferably 3% or lower, even more preferably 2% or lower, and particularly preferably 1.5% or lower.

The lithium-containing glass to be chemically strengthened in the present invention has a composition as described above. To obtain a glass having the aforementioned composition, glass raw materials are prepared suitably, and heated to be melted in a glass melting furnace. After that, the glass is homogenized by bubbling, stirring, addition of refining agent, etc., formed into a glass sheet having a prescribed thickness, and then annealed. Alternatively, the glass may be formed into a sheet shape by a method of forming the glass into a block, annealing the block, and then cutting the block.

Examples of methods for forming the glass into a sheet shape include a float process, a press process, a fusion process, and a down draw process. Particularly when a large-size glass sheet is manufactured, the float process is preferred. In addition, a continuous forming method other than the float process, for example, the fusion process or the down draw process is also preferred.

The lithium-containing glass may be a crystallized glass. When it is a crystallized glass, the crystallized glass containing a crystal of one or more kinds selected from the group consisting of a lithium silicate crystal, a lithium aluminosilicate crystal, and a lithium phosphate crystal is preferable. A lithium metasilicate crystal, a lithium disilicate crystal, or the like is preferred as the lithium silicate crystal. A lithium orthophosphate crystal or the like is preferred as the lithium phosphate crystal. A β-spodumene crystal, a petalite crystal or the like is preferred as the lithium aluminosilicate crystal.

In order to enhance the mechanical strength, the crystallinity of the crystallized glass is preferably 10% or higher, more preferably 15% or higher, even more preferably 20% or higher, and particularly preferably 25% or higher. On the other hand, in order to enhance the transparency, the crystallinity is preferably 70% or lower, more preferably 60% or lower, and particularly preferably 50% or lower. Low crystallinity is advantageous in terms of easily forming the glass by heating and bending or the like. The crystallinity can be calculated by a Rietveld method from X-ray diffraction intensity. The Rietveld method is described in "Handbook for Analysis of Crystals" edited by "Handbook for Analysis of Crystals" Editorial Board of The Crystallographic Society of Japan, (p. 492-499, Kyoritsu Shuppan Co. Ltd., 1999)

Average particle size of deposited crystals of the crystallized glass is preferably 300 nm or less, more preferably 200 nm or less, even more preferably 150 nm or less, and particularly preferably 100 nm or less in order to enhance the transparency. The average particle size of the deposited crystals can be obtained from a transmission electron microscope (TEM) image. Alternatively the average particle size can be estimated from a scanning electron microscope (SEM) image.

Examples

The present invention will be described below along its examples. However, the present invention is not limited thereto.

Glass raw materials were prepared to have the following composition expressed by mole percentage in terms of oxides, and weighed to be 400 g as glass. Next, the mixed raw materials were put into a platinum crucible, placed into an electric furnace at 1500 to 1700° C. to be melted for about 3 hours, degassed and homogenized. The glass had a composition of 68.9% of $SiO_2$, 12.4% of $Al_2O_3$, 1.3% of $Y_2O_3$, 0.3% of $ZrO_2$, 10.8% of $Li_2O$, 4.8% of $Na_2O$, 1.2% of $K_2O$, and 0.3% of the other components.

The obtained molten glass was poured into a metal mold, and kept for 1 hour at a temperature about 50° C. higher than a glass transition point. After that, the molten glass was cooled down to room temperature at a rate of 0.5° C./min. Thus, a glass block was obtained. The obtained glass block was cut and ground, and finally both surfaces thereof were mirror-polished. Thus, a glass sheet with 600 µm thick was obtained.

Chemical strengthening treatments shown in Tables 1 to 3 were performed on each obtained glass sheet, thereby preparing chemically strengthened glasses of the following Examples 1 to 18. Using each first molten salt composition shown in the section of first ion exchange shown in Tables 1 to 3, chemical strengthening treatment was performed on the glass retained at each temperature shown in the section of temperature of the first ion exchange and for each time shown in the section of time of the first ion exchange. After that, using each second molten salt composition shown in the section of second ion exchange, chemical strengthening treatment was performed on the glass retained at each temperature shown in the section of temperature of the second ion exchange and for each time shown in the section of time of the second ion exchange. Thus, each chemically strengthened glass was obtained.

Results are shown in Tables 1 to 3. Examples 1 to 6 and Examples 17 to 19 are inventive examples, and Examples 7 to 16 are comparative examples. In Table 3, the addition amount of additives in the second molten salt composition is expressed as a ratio to a total amount of the second molten salt composition, regarding the total amount excluding the additives as 100%.

Each obtained chemically strengthened glass was evaluated by the following methods.

[Measurement of Stress by Scattered Light Photoelastic Stress Meter]

Stress was measured by a method described in WO2018/056121 using a scattered light photoelastic stress meter (SLP-1000 made by Orihara Manufacturing Co., Ltd.). In addition, the stress was measured by use of Software [SlpIV (Ver. 2019.01.10.001)] attached to the scattered light photoelastic stress meter (SLP-1000 made by Orihara Manufacturing Co., Ltd.). In addition, compressive stress values $CS_0$ and $CS_{50}$, a maximum tensile stress value CT, a depth of compressive stress layer DOL, and a first-order differential value $CS_x'$ and a second-order differential value $CS_x''$ of a compressive stress value were calculated from an obtained stress profile by the method described above.

A function used for obtaining the stress profile was $\sigma(x)=(a_1*\mathrm{erfc}(a_2*x)+a_3*\mathrm{erfc}(a_4*x)+a_5)$, where $a_i$ ($i=1$ to 5) is a fitting parameter, and erfc is a complementary error function. The complementary error function is defined by the following expression.

$$\mathrm{erfc}(x) = \frac{2}{\sqrt{\pi}} \int_x^\infty e^{-t^2} dt \qquad \text{[Expression 1]}$$

On this evaluation, the residual sum of squares between obtained raw data and the aforementioned function was minimized in accordance with the specification of the attached software to optimize the fitting parameters. Specified and selected are one shot as measuring process condition, an edge method for a surface as measuring area processing/adjusting item, 6.0 µm for internal surface end, automatic for internal left/right end, automatic (sample film thickness center) for internal deep part end, and a fitting curve for phase curve extension to sample thickness center, respectively.

In addition, a concentration distribution of alkali metal ions (sodium ions and potassium ions) in a sectional direction was measured concurrently by SEM-EDX (EPMA), and it was confirmed that there is no conflict with the obtained stress profile.

[Measurement of Stress by Glass Surface Stress Meter]

By use of a glass surface stress meter (FSM-6000 made by Orihara Manufacturing Co., Ltd.), stress was measured by a nondestructive measuring method based on an optical waveguide effect and a photoelastic effect. By use of software named PMC, which is made by Orihara Manufacturing Co., Ltd., the measured stress was synthesized with the stress measured by the scattered light photoelastic stress meter to thereby obtain a profile.

Figure 7A:
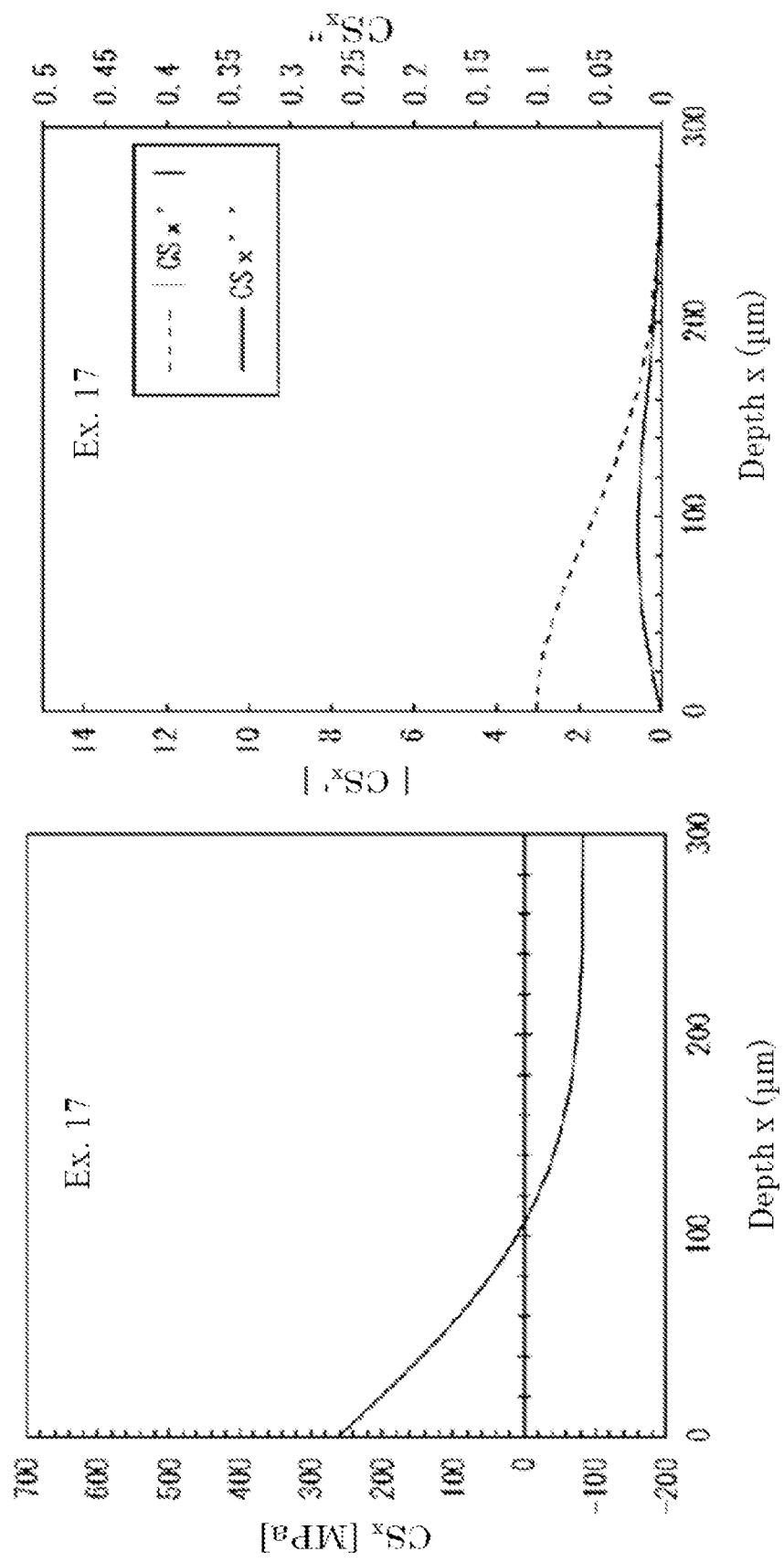
FIG. 7A to FIG. 7C show the profile of the stress value $CS_x$ and the absolute values of the first-order differentiation $CS_x'$ and the second-order differentiation $CS_x''$ in the profile of the stress value $CS_x$ in Examples.
Figure 7B:
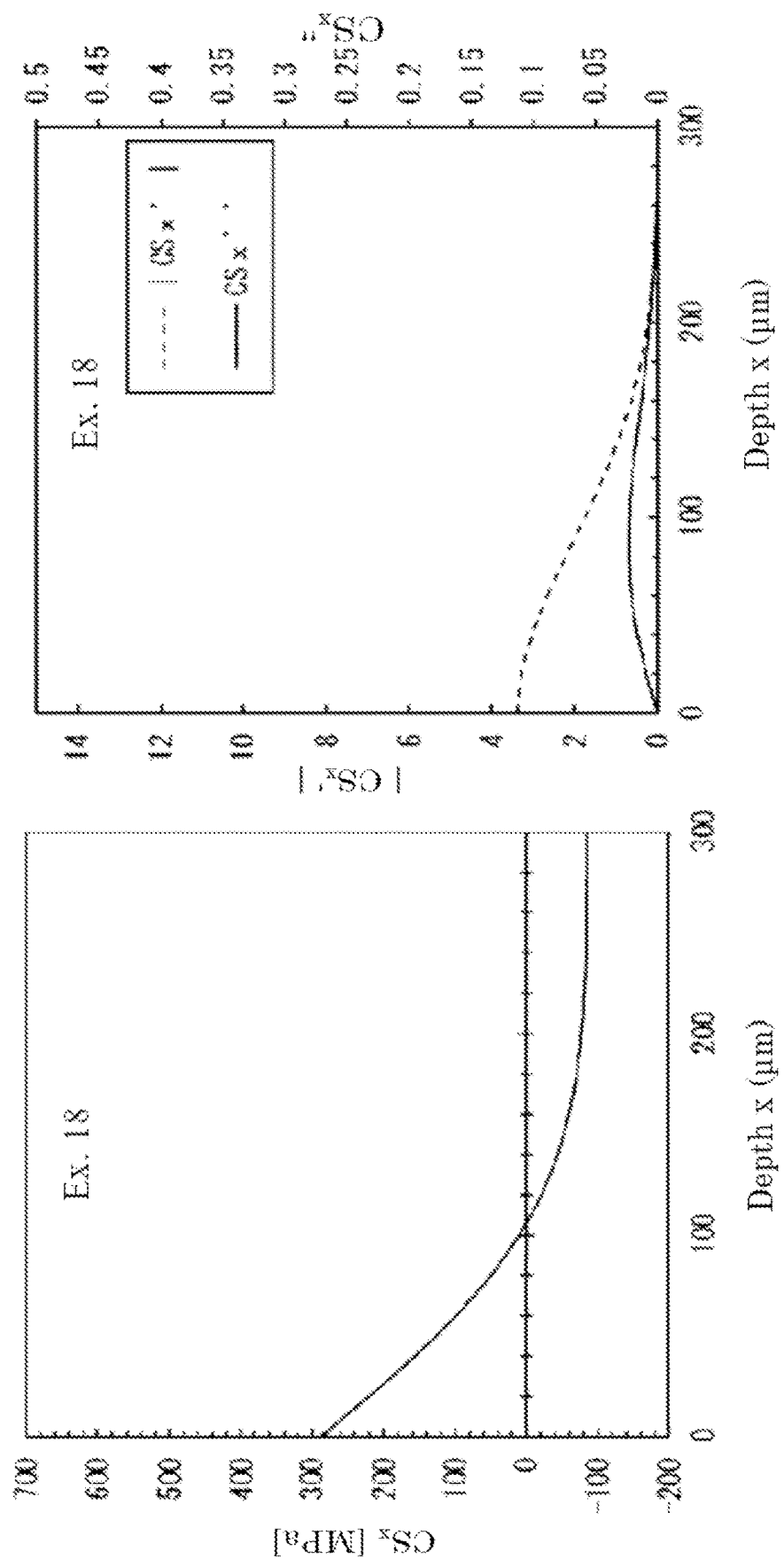
Figure 7C:
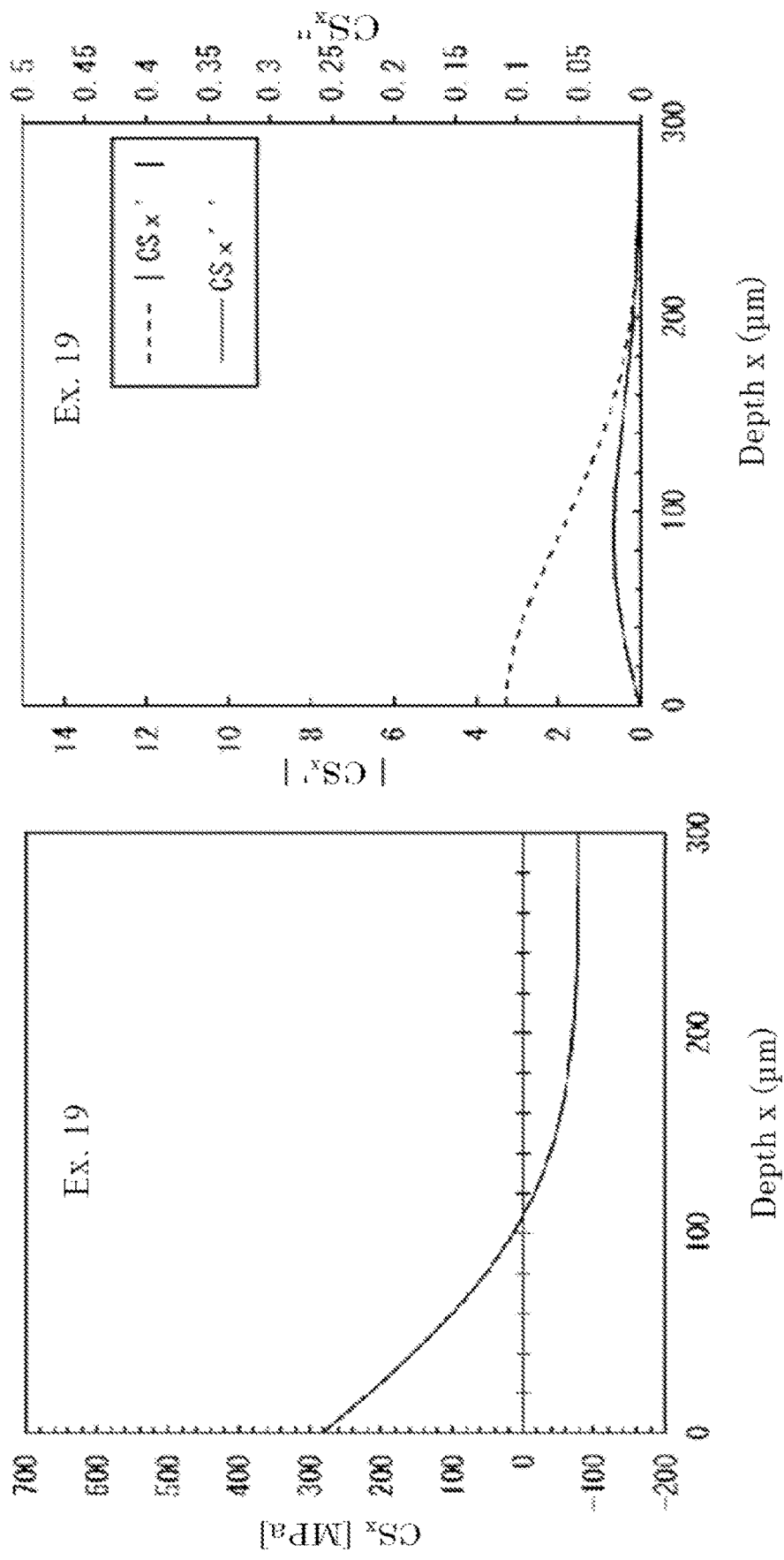
Figure 8A:
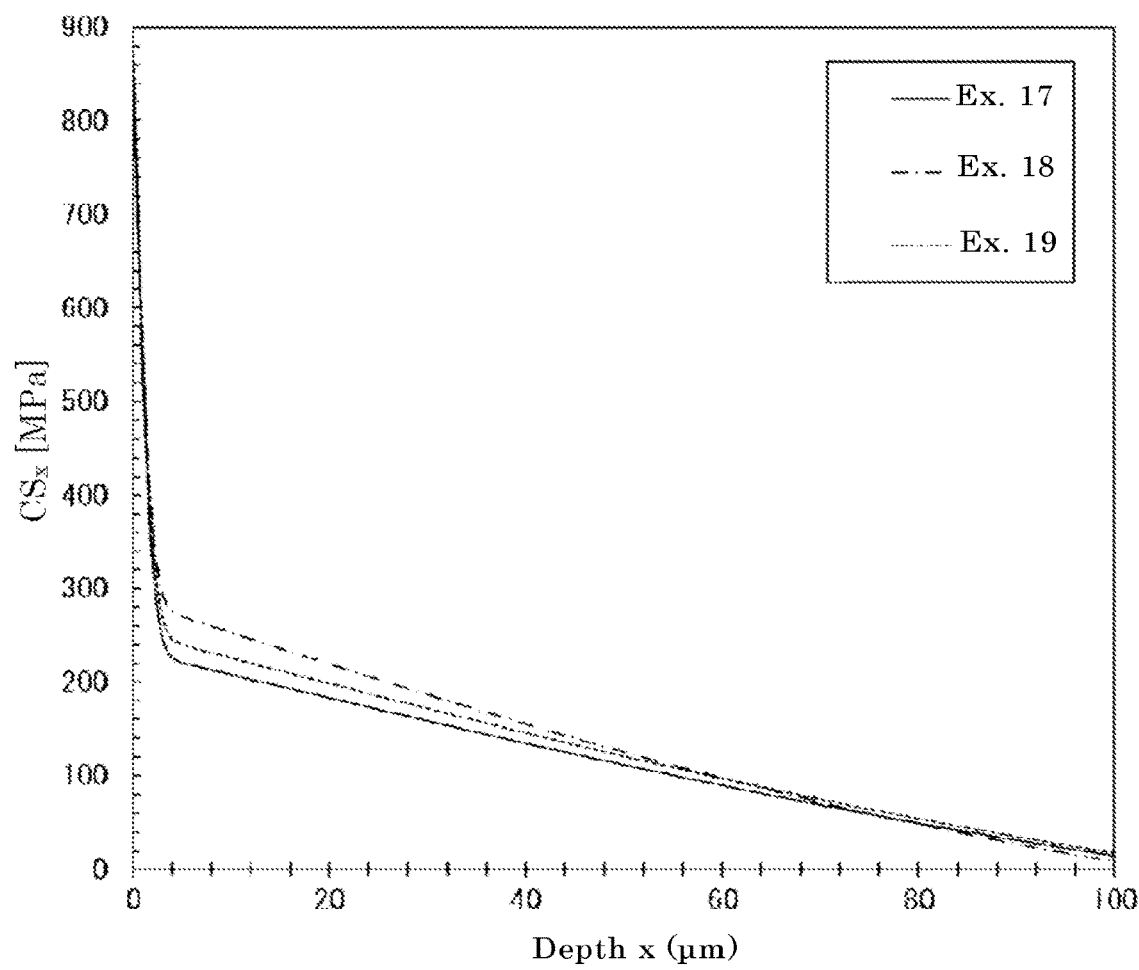
FIG. 8A and FIG. 8B show stress profiles in synthesized profiles in Examples.
Figure 8B:
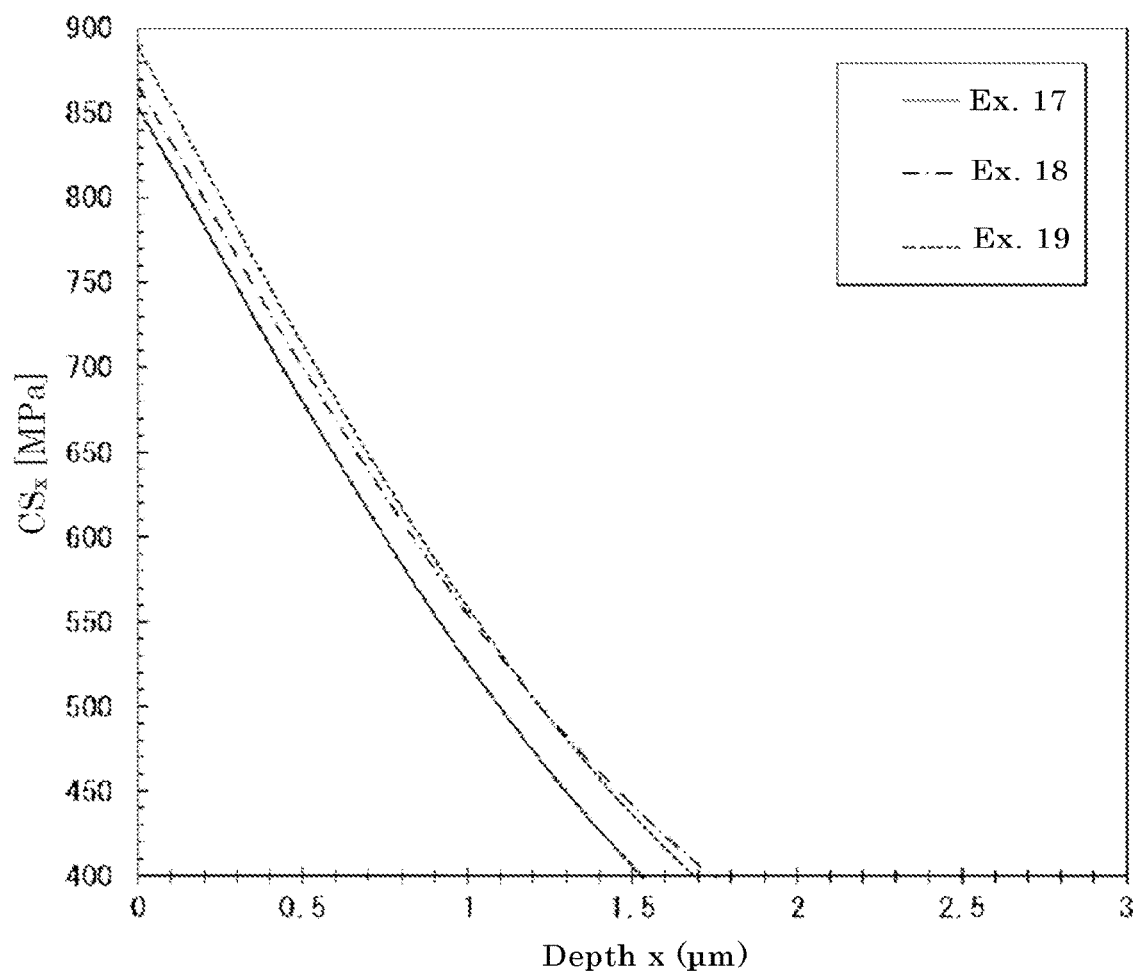

Results are shown in Tables 1 to 3 and FIG. 4A to FIG. 4D, FIG. 5A to FIG. 5D, FIG. 6, FIG. 7A to FIG. 7C, and FIG. 8A and FIG. 8B. FIG. 4A to FIG. 4D show profiles of stress values $CS_x$ measured by SLP in Examples 1 to 16. FIG. 5A to FIG. 5D show graphs of $CS_x'$ and $CS_x''$ in Examples 1 to 16. FIG. 7A to FIG. 7C show profiles of stress values $CS_x$ measured by SLP and graphs of $CS_x'$ and $CS_x''$ in Examples 17 to 19. FIG. 8A and FIG. 8B show graphs of stress profiles in which stresses measured by SLP and FSM were synthesized in Examples 17 to 19. For the sake of visibility, absolute values of $CS_x'$ were plotted.

[Falling Strength Test]

A falling strength test was performed on each sample of Example 2 and Example 9, in which an obtained glass sample measuring 120×60×0.7 mmt was fitted into a structure whose mass and rigidity were adjusted to dimensions of a general smartphone currently available. The pseudo-smartphone prepared thus was allowed to fall freely onto a #180SiC sandpaper sheet. When the glass of the pseudo-smartphone fall from a height of 5 cm was not cracked, the falling height was increased by 5 cm, and the pseudo-smartphone was allowed to fall again. Such operation was repeated until the glass of the pseudo-smartphone was cracked. The height at which the glass of the pseudo-smartphone was cracked for the first time was regarded as falling height. The falling test was performed on 19 samples in each of Examples. Results are shown as box-and-whisker plots in FIG. 6.

[Crushed Piece Number Test]

A glass processed to be square with a side of 50 mm was chemically strengthened. A crushing test in which a diamond indenter having a point angle of 90 degrees was driven on the obtained glass was performed. When the glass was not broken, a load applied to the indenter was increased gradually. The test was performed repeatedly in this manner, and the number of crushed pieces at the minimum load with which the glass was broken was counted as the number of crushed pieces. When the number of crushed pieces exceeds 10, CT can be determined as beyond the CT limit.

TABLE 1

|  |  | Example 1 | Example 2 | Example 3 | Example 4 | Example 5 | Example 6 | Example 7 | Example 8 |
|---|---|---|---|---|---|---|---|---|---|
| First ion exchange | First molten salt composition (wt %) | $KNO_3$ 65 $NaNO_3$ 35 | $KNO_3$ 70 $NaNO_3$ 30 | $KNO_3$ 70 $NaNO_3$ 30 | $KNO_3$ 70 $NaNO_3$ 30 | $KNO_3$ 60 $NaNO_3$ 40 | $KNO_3$ 60 $NaNO_3$ 40 | $NaNO_3$ 100 | $NaNO_3$ 100 |
|  | Temperature (° C.) | 420 | 420 | 420 | 420 | 420 | 420 | 380 | 380 |
|  | Time (min) | 80 | 85 | 90 | 90 | 70 | 70 | 150 | 150 |
| Second ion exchange | Second molten salt composition (wt % of nitrate) | $KNO_3$ 99.5 $LiNO_3$ 0.5 | $KNO_3$ 99.5 $LiNO_3$ 0.5 | $KNO_3$ 99 $LiNO_3$ 1 | $KNO_3$ 99 $LiNO_3$ 1 | $KNO_3$ 97 $LiNO_3$ 3 | $KNO_3$ 98.2 $NaNO_3$ 1 $LiNO_3$ 0.8 | $KNO_3$ 100 | $KNO_3$ 100 |
|  | Temperature (° C.) | 380 | 380 | 380 | 380 | 380 | 420 | 400 | 380 |
|  | Time (min) | 24 | 24 | 20 | 20 | 10 | 5 | 50 | 110 |
| Thickness t (mm) |  | 0.75 | 0.75 | 0.75 | 0.65 | 0.65 | 0.65 | 0.75 | 0.75 |
| $CS_x''$ maximum value |  | 0.031 | 0.031 | 0.029 | 0.024 | 0.027 | 0.046 | 0.317 | 0.513 |
| $CS_x''$ minimum value |  | 0.026 | 0.027 | 0.023 | 0.018 | 0.024 | 0.022 | 0.022 | 0.017 |
| $CS_x'$ maximum value |  | −1.513 | −1.626 | −1.475 | −1.426 | −1.525 | −1.575 | −1.450 | −1.313 |
| $CS_x'$ minimum value |  | −4.116 | −4.129 | −4.232 | −3.602 | −3.654 | −4.973 | −11.070 | −11.024 |
| −120t + 164 |  | 74 | 74 | 74 | 86 | 86 | 86 | 74 | 74 |
| −120t + 150 |  | 60 | 60 | 60 | 72 | 72 | 72 | 60 | 60 |
| $CS_0$ (MPa) |  | 332 | 374 | 340 | 292 | 296 | 344 | 428 | 365 |
| CT (MPa) |  | 69 | 72 | 72 | 83 | 73 | 81 | 70 | 72 |
| $CS_{50}$ (MPa) |  | 141 | 144 | 147 | 128 | 126 | 131 | 124 | 125 |
| $CS_{50}/(CT \times (t - 2 \times DOL))/t$ (/mm²) |  | 5.18 | 5.07 | 5.23 | 5.57 | 6.04 | 5.70 | 4.41 | 4.44 |
| DOL (μm) |  | 110 | 110 | 114 | 113 | 106 | 107 | 109 | 116 |
| CT after two stages of strengthening/CT after one stage of strengthening |  | 0.91 | 0.92 | 0.92 | 0.91 | 0.83 | 0.92 | 1.07 | 1.10 |

TABLE 2

|  |  | Example 9 | Example 10 | Example 11 | Example 12 | Example 13 | Example 14 | Example 15 | Example 16 |
|---|---|---|---|---|---|---|---|---|---|
| First ion exchange | First molten salt composition (wt %) | $NaNO_3$ 100 | $KNO_3$ 65 $NaNO_3$ 35 | $KNO_3$ 70 $NaNO_3$ 30 | $KNO_3$ 70 $NaNO_3$ 30 | $NaNO_3$ 100 | $NaNO_3$ 100 | $KNO_3$ 70 $NaNO_3$ 30 | $KNO_3$ 60 $NaNO_3$ 40 |
|  | Temperature (° C.) | 380 | 420 | 420 | 420 | 380 | 380 | 420 | 420 |
|  | Time (min) | 150 | 80 | 85 | 90 | 150 | 150 | 90 | 70 |
| Second ion exchange | Second molten salt composition (wt % of nitrate) | $KNO_3$ 100 | — | — | — | — | $KNO_3$ 100 | — | — |
|  | Temperature (° C.) | 400 | — | — | — | — | 400 | — | — |
|  | Time (min) | 90 | — | — | — | — | 60 | — | — |
| Thickness t (mm) |  | 0.75 | 0.75 | 0.75 | 0.75 | 0.75 | 0.65 | 0.65 | 0.65 |
| $CS_x''$ maximum value |  | 0.203 | 0.277 | 0.313 | 0.545 | 0.071 | 0.234 | 0.213 | 0.396 |
| $CS_x''$ minimum value |  | 0.014 | 0.031 | 0.029 | 0.029 | 0.056 | 0.013 | 0.022 | 0.029 |

TABLE 2-continued

|  | Example 9 | Example 10 | Example 11 | Example 12 | Example 13 | Example 14 | Example 15 | Example 16 |
|---|---|---|---|---|---|---|---|---|
| $CS_x'$ maximum value | −1.144 | −1.767 | −1.734 | −1.717 | −2.149 | −1.262 | −1.653 | −1.711 |
| $CS_x'$ minimum value | −6.350 | −12.909 | −13.998 | −18.014 | −6.866 | −9.089 | −10.869 | −13.081 |
| −120t + 164 | 74 | 74 | 74 | 74 | 74 | 86 | 86 | 86 |
| −120t + 150 | 60 | 60 | 60 | 60 | 60 | 72 | 72 | 72 |
| $CS_0$ (MPa) | 265 | 540 | 566 | 599 | 438 | 376 | 481 | 480 |
| CT (MPa) | 72 | 76 | 78 | 78 | 66 | 87 | 91 | 88 |
| $CS_{50}$ (MPa) | 125 | 131 | 133 | 131 | 132 | 113 | 124 | 148 |
| $CS_{50}/(CT \times (t - 2 \times DOL))/t$ (/mm²) | 4.44 | 4.17 | 4.12 | 4.08 | 4.69 | 4.70 | 4.70 | 5.74 |
| DOL (μm) | 114 | 99 | 100 | 101 | 89 | 114 | 102 | 100 |
| CT after two stages of strengthening/CT after one stage of strengthening | 1.09 | — | — | — | — | — | — | — |

TABLE 3

|  |  | Example 17 | Example 18 | Example 19 |
|---|---|---|---|---|
| First ion exchange | First molten salt composition (wt %) | $KNO_3$ 60 $NaNO_3$ 40 | $KNO_3$ 60 $NaNO_3$ 40 | $KNO_3$ 60 $NaNO_3$ 40 |
|  | Temperature (° C.) | 420 | 420 | 420 |
|  | Time (min) | 75 | 75 | 75 |
| Second ion exchange | Second molten salt composition (wt %) | $KNO_3$ 99.4 $LiNO_3$ 0.6 | $KNO_3$ 99.4 $LiNO_3$ 0.6 | $KNO_3$ 99.4 $LiNO_3$ 0.6 |
|  | Additive (wt % to total amount of second molten salt composition) | — | silica gel 0.5 | $K_2CO_3$ 0.25 silica gel 0.5 |
|  | Temperature (° C.) | 450 | 450 | 450 |
|  | Time (min) | 5 | 5 | 5 |
| SLP profile | Thickness t (mm) | 0.65 | 0.65 | 0.65 |
|  | $CS_x''$ maximum value | 0.020 | 0.023 | 0.022 |
|  | $CS_x''$ minimum value | 0.001 | 0.001 | 0.001 |
|  | $CS_x'$ maximum value | −0.839 | −0.853 | −0.822 |
|  | $CS_x'$ minimum value | −3.042 | −3.400 | −3.281 |
|  | −120t + 164 | 86 | 86 | 86 |
|  | −120t + 150 | 72 | 72 | 72 |
|  | $CS_0$ (MPa) | 262 | 289 | 281 |
|  | CT (MPa) | 83 | 84 | 78 |
|  | $CS_{50}$ (MPa) | 118 | 128 | 126 |
|  | $CS_{50}/(CT \times (t - 2 \times DOL))/t$ (/mm²) | 4.95 | 5.38 | 5.71 |
|  | DOL (μm) | 106 | 107 | 108 |
|  | CT after two stages of strengthening/CT after one stage of strengthening | — | — | — |
| SLP + FSM synthesized profile | $CS_0$ (MPa) | 854 | 866 | 889 |
|  | $CS_{50}$ (MPa) | 106 | 119 | 115 |
|  | CT (MPa) | 83 | 84 | 78 |
|  | DOL (μm) | 110 | 105 | 111 |

As shown in Tables 1 and 2, in Examples 1 to 6 which are inventive examples, it is understood that $CS_x''$ is larger than 0 and 0.050 or less, $CS_{50}$ can be made larger than in the comparative examples, and the falling strength is improved.

In addition, in Examples 1 to 6, the maximum tensile stress value CT was introduced up to −120t+164 or more in the first ion exchange. CT obtained thus was beyond the CT limit. On the other hand, the maximum tensile stress value CT was smaller than −120t+164 in the second ion exchange. CT obtained thus was smaller than the CT limit. The ratio of CT after the second ion exchange to CT after the first ion exchange (CT after two stages of strengthening/CT after one stage of strengthening in Table 1) was 0.95 or less. In this manner, in Examples 1 to 6, a sufficient compressive stress is introduced by the first ion exchange, and the total amount of compressive stress is reduced to avoid the CT limit by the second ion exchange while keeping $CS_{50}$ high.

On the other hand, in Examples 9 and 13 which are comparative examples, the tensile stress value CT after the second ion exchange is larger than the tensile stress value CT after the first ion exchange, while the value $CS_{50}$ after the second ion exchange is smaller than that after the first ion exchange.

Further, as shown in Table 3, in Examples 17 to 19 which are inventive examples, it is understood that silica gel, or silica gel and potassium carbonate are added to the second molten salt so that "Na—K exchange" can be promoted to improve $CS_0$ in the synthesized profile based on SLP and FSM.

The present application is based on Japanese Patent Application No. 2020-131057 filed on Jul. 31, 2020, and Japanese Patent Application No. 2021-030729 filed on Feb. 26, 2021, the disclosure of which is incorporated herein by reference.

What is claimed is:
1. A chemically strengthened glass having a thickness of t [mm], and having a profile of a stress value $CS_x$ [MPa] at a depth x [μm] from a surface of the glass, the stress value being measured by a scattered-light photoelastic stress meter,
wherein a second-order differential value $CS_x''$ of the stress value $CS_x$ in the profile satisfies the following expression within a range of $CS_x \geq 0$:

$$0 < CS_x'' \leq 0.050.$$

2. The chemically strengthened glass according to claim 1, wherein a tensile stress value $CT_2$ [MPa] satisfies the following expression using the thickness t [mm]:

$$CT_2 \leq -120t + 164.$$

3. The chemically strengthened glass according to claim 1, wherein a tensile stress value $CT_2$ [MPa] satisfies the following expression using the thickness t [mm]:

$$-120t + 150 \leq CT_2.$$

4. The chemically strengthened glass according to claim 1, wherein a stress value $CS_{50}$ at a depth of 50 [μm] from the surface of the glass satisfies the following expression using the thickness t [mm], the tensile stress $CT_2$ [MPa] and a depth DOL [mm] of a compressive stress layer:

$$CS_{50}/(CT_2 \times (t - 2 \times DOL))/t \geq 4.90.$$

5. The chemically strengthened glass according to claim 1, wherein a first-order differential value $CS_x'$ of the stress value $CS_x$ [MPa] in the profile is −5.3 or more.

6. The chemically strengthened glass according to claim 1, wherein the chemically strengthened glass is a chemically strengthened glass that has been chemically strengthened at two or more stages, and
the tensile stress value $CT_2$ [MPa] of the chemically strengthened glass is a value as large as 50% to 93% of a tensile stress value $CT_1$ [MPa] of the chemically strengthened glass that has been chemically strengthened at the first stage of the two or more stages.

7. The chemically strengthened glass according to claim 1, wherein a base composition of the chemically strengthened glass comprises, by mol % in terms of oxides:
52 to 75% of $SiO_2$;
8 to 20% of $Al_2O_3$;
5 to 16% of $LiO_2$; and
8% or lower of $NaO_2$.

8. A method of manufacturing the chemically strengthened glass of claim 1, the method comprising:
immersing a lithium-containing glass into a first molten salt composition comprising sodium ions and potassium ions to thereby perform first ion exchange; and
immersing the lithium-containing glass into a second molten salt composition comprising potassium ions to thereby perform second ion exchange,
wherein in the first molten salt composition, a concentration of potassium nitrate is higher than a concentration of sodium nitrate, and
in the second molten salt composition, a concentration of potassium nitrate is 85 mass % or higher, and a mass ratio of sodium ions to lithium ions is 0 or higher and 15 or lower.

9. The method of manufacturing a chemically strengthened glass according to claim 8, wherein the concentration of potassium nitrate in the first molten salt composition is higher than 50 mass %.

10. The method of manufacturing a chemically strengthened glass according to claim 8, wherein the second molten salt composition comprises sodium nitrate whose concentration is higher than 0 mass % and 5 mass % or lower.

11. The method of manufacturing a chemically strengthened glass according to claim 8, wherein the second molten salt composition comprises lithium ions whose concentration is 0.1 mass % or higher and 10 mass % or lower.

12. The method of manufacturing a chemically strengthened glass according to claim 8, wherein in the first ion exchange, the first molten salt composition has a temperature of 380° C. or higher and 450° C. or lower.

13. The method of manufacturing a chemically strengthened glass according to claim 12, wherein in the first ion exchange, the lithium-containing glass is immersed in the first molten salt composition for 0.5 hours or more and 8 hours or less.

14. The method of manufacturing a chemically strengthened glass according to claim 8, wherein in the second ion exchange, the second molten salt composition has a temperature of 380° C. or higher and 450° C. or lower.

15. The method of manufacturing a chemically strengthened glass according to claim 14, wherein in the second ion exchange, the lithium-containing glass is immersed in the second molten salt composition for an immersion time t2 [min] satisfying the following expression using a temperature T [° C.] of the second molten salt composition:

$$-0.38T + 173 < t2 < -1.4T + 650.$$

16. The method of manufacturing a chemically strengthened glass according to claim 8, wherein the chemical strengthening is performed so that a tensile stress value $CT_2$ [MPa] of the chemically strengthened glass after the second ion exchange is a value corresponding to 50% to 93% of a tensile stress value $CT_1$ [MPa] of the chemically strengthened glass after the first ion exchange.

17. The method of manufacturing a chemically strengthened glass according to claim 8, wherein a tensile stress value $CT_1$ [MPa] of the chemically strengthened glass after the first ion exchange satisfies the following expression using a thickness t [mm] of the chemically strengthened glass:

$$CT_1 > -120t + 164.$$

18. The method of manufacturing a chemically strengthened glass according to claim 8, wherein the lithium-containing glass comprises, by mol % in terms of oxides:
52 to 75% of $SiO_2$;
8 to 20% of $Al_2O_3$;
5 to 16% of $LiO_2$; and
8% or lower of $NaO_2$.

19. The method of manufacturing a chemically strengthened glass according to claim 8, wherein the second molten salt composition comprises silicic acid.

20. The method of manufacturing a chemically strengthened glass according to claim 8, wherein the second molten salt composition comprises carbonate.

* * * * *